US011525932B2

(12) United States Patent
Rokkan et al.

(10) Patent No.: US 11,525,932 B2
(45) **Date of Patent: *Dec. 13, 2022**

(54) FLAT CONTACT QUICK CONNECT CONNECTION FOR AN AUTONOMOUS SEISMIC NODE

(71) Applicant: Seabed Geosolutions B.V., Leidschendam (NL)

(72) Inventors: Arne Henning Rokkan, Olsvik (NO); Richard Edward Henman, Olsvik (NO)

(73) Assignee: Seabed Geosolutions B.V., Leidschendam (NL)

( * ) Notice: Subject to any disclaimer, the term of this patent is extended or adjusted under 35 U.S.C. 154(b) by 543 days.

This patent is subject to a terminal disclaimer.

(21) Appl. No.: 16/424,181

(22) Filed: May 28, 2019

(65) Prior Publication Data

US 2019/0285762 A1 Sep. 19, 2019

Related U.S. Application Data

(63) Continuation of application No. 15/165,780, filed on May 26, 2016, now Pat. No. 10,345,462.

(Continued)

(51) Int. Cl.

*G01V 1/00* (2006.01)
*G01V 1/16* (2006.01)

(Continued)

(52) U.S. Cl.

CPC .............. *G01V 1/166* (2013.01); *G01V 1/162* (2013.01); *G01V 1/3808* (2013.01);

(Continued)

(58) Field of Classification Search

USPC .......................................................... 367/173

See application file for complete search history.

(56) References Cited

U.S. PATENT DOCUMENTS 3,478,297 A 11/1969 Gimpel et al.
6,024,344 A 2/2000 Buckley et al.

(Continued)

FOREIGN PATENT DOCUMENTS

GB 1524459 A 9/1978

OTHER PUBLICATIONS

Cranford, A Direct-Recording Ocean-Bottom Seismograph, Bulletin of the Seismological Society of America, vol. 36, No. 2, 607-615 (Apr. 1976) ("Cranford").

(Continued)

*Primary Examiner* — James R Hulka

(74) *Attorney, Agent, or Firm* — Park, Vaughan, Fleming & Dowler LLP; Shane Nelson

(57) ABSTRACT

Apparatuses, systems, and methods for data and/or power transfer to and from an ocean bottom seismic node are described. In an embodiment, an autonomous seismic node is configured with a bulkhead connector assembly that may be coupled to a plug assembly for data and/or power transfer and a pressure cap assembly when utilized subsea. A plurality of pins may be located on the bulkhead assembly in a substantially flat contact surface to obtain an external electrical connection to the node. The pins on the bulkhead assembly may form a flat circuit with an external device, such as a plug assembly or pressure cap assembly. One or more external devices may be coupled to the pressure cap assembly and/or bulkhead connector for increased functionality to the node. A quick release assembly and/or locking ring may be utilized to fasten any external device to the bulkhead connector assembly.

18 Claims, 19 Drawing Sheets

200
204
202
212
206
204
210
214
216

Related U.S. Application Data

(60) Provisional application No. 62/168,481, filed on May 29, 2015.

(51) Int. Cl.

*H01R 13/523* (2006.01)
*G01V 1/38* (2006.01)
*G01V 1/20* (2006.01)
*H01R 13/22* (2006.01)
*H01R 13/623* (2006.01)

(52) U.S. Cl.

CPC .......... *H01R 13/523* (2013.01); *G01V 1/202* (2013.01); *H01R 13/22* (2013.01); *H01R 13/623* (2013.01)

(56) References Cited

U.S. PATENT DOCUMENTS 6,951,138 B1 10/2005 Jones
6,997,731 B1 2/2006 Wood et al.
7,195,505 B1 3/2007 Becker
7,286,442 B2 10/2007 Ray et al.
7,310,287 B2 12/2007 Ray et al.
7,324,406 B2 1/2008 Berg
7,646,670 B2 1/2010 Maxwell et al.
7,668,047 B2 2/2010 Ray et al.
7,675,821 B2 3/2010 Berg et al.
7,883,292 B2 2/2011 Thompson et al.
8,427,900 B2 4/2013 Fleure et al.
8,675,446 B2 3/2014 Gateman et al.
9,720,116 B2 * 8/2017 Guyton .................. G01V 1/247
9,768,626 B2 * 9/2017 Henman ............... H02J 7/0045
9,778,386 B2 * 10/2017 Naes ........................ G01V 1/38
9,829,589 B2 11/2017 Ray et al.
9,846,250 B2 * 12/2017 Rokkan ................ G01V 1/3852
9,873,496 B2 * 1/2018 Rokkan ................ G01V 1/3852
9,891,333 B2 * 2/2018 Valsvik ................ G01V 1/3852
9,958,565 B2 * 5/2018 Henman .............. G01V 1/3843
10,345,462 B2 * 7/2019 Rokkan .................. G01V 1/162
10,422,908 B2 * 9/2019 Ray .......................... G01V 1/18
10,539,696 B2 * 1/2020 Ray .......................... G01V 1/18
10,557,958 B2 * 2/2020 Ray ........................ G01V 1/166
2005/0052951 A1 3/2005 Ray et al.
2009/0068871 A1 3/2009 Klassen et al.
2009/0290453 A1 11/2009 Ray et al.
2014/0126329 A1 5/2014 Guyton et al.
2014/0140170 A1 5/2014 Brizard
2014/0186122 A1 * 7/2014 Thompson ............. B63C 11/00 405/190
2015/0331130 A1 * 11/2015 Henman .............. G01V 1/3852 405/158
2015/0362606 A1 * 12/2015 Henman ............... G01V 1/201 367/15
2016/0056645 A1 2/2016 Henman et al.
2016/0062056 A1 3/2016 Becker
2016/0349386 A1 12/2016 Naes
2016/0349387 A1 * 12/2016 Rokkan ................ G01V 1/3808
2016/0377757 A1 * 12/2016 Henman .............. G01V 1/3843 405/158
2017/0017003 A1 * 1/2017 Naes ........................ G01V 1/18
2017/0212261 A1 * 7/2017 Thompson .............. B63B 22/00
2017/0299749 A1 * 10/2017 Thompson .............. B63B 22/00
2018/0003836 A1 * 1/2018 Morris ................ G01V 1/3808
2018/0003837 A1 * 1/2018 Morris ..................... G01V 1/22
2018/0026727 A1 * 1/2018 Lacovara .............. H04B 13/02 398/104
2018/0034558 A1 * 2/2018 Hopewell ............. H04B 10/80
2018/0356550 A1 * 12/2018 Morris ................ G01V 1/3808
2019/0268077 A1 * 8/2019 Lacovara .............. G08C 23/04
2020/0213013 A1 * 7/2020 Lacovara ............ H04B 10/503

OTHER PUBLICATIONS

Mattaboni, MITOBs: A Seismometer System for Ocean-Bottom Earthquake Studies, Marine Geophysical Researches 3 (1977), pp. 87-102 ("Mattaboni").

http://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America, vol. 83, No. 1., 190-217 (Feb. 1993) ("Willoughby").

Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, SACLANTCEN Report SR-71 (1983) ("Schmalfeldt").

Eguchi, A real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

Petition for Inter Partes Review of U.S. Pat. No. Re. 45,268, dated Apr. 27, 2018.

Petition for Inter Partes Review of U.S. Pat. No. 8,879,362, dated Apr. 27, 2018.

Petition for Inter Partes Review of U.S. Pat. No. 8,228,761, dated Apr. 27, 2018.

European Search Report for Application No. 16305618, dated Oct. 26, 2016, Part 1.

European Search Report for Application No. 16305618, dated Oct. 26, 2016, Part 2.

* cited by examiner

400

FLAT CONTACT QUICK CONNECT CONNECTION FOR AN AUTONOMOUS SEISMIC NODE

PRIORITY

The present application is a continuation of U.S. patent application Ser. No. 15/165,780, filed on May 26, 2016, which claims priority to U.S. provisional patent application No. 62/168,481, filed on May 29, 2015. The entire contents of each of the above documents is incorporated herein by reference.

BACKGROUND OF THE INVENTION

Field of the Invention

This invention relates to data and/or power connectors and more particularly relates to such connectors for an autonomous seismic node and for other subsea devices.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

Typically, each autonomous node generally has an electrical interface connector that, once the node is retrieved to a marine vessel, a separate physical plug or interface connector must be manually inserted, connected, or plugged into the node to transmit data and/or power to and from the node. The portion of the coupling device that passes through the node pressure vessel housing wall is typically called a bulkhead connector. FIGS. 1A and 1B illustrate a conventional bulkhead connector and corresponding female receptacle. For example, FIG. 1A shows a bulkhead connector that may be mounted to the exterior portion of an autonomous seismic node. This connector (as is typical in conventional coupling devices) includes a plurality of pins that must mate with a corresponding mechanical connector with a female end. The protruding male pins mate with corresponding female receptacles to form an electrically conductive path. This type of connection is similar to any standard conventional data/power coupling that includes a plug with a male end (with pins or sockets) and an opposing mechanical connector with a female end. FIG. 1B shows a sealing cap with a plurality of recesses or holes configured to seal around each pin. Such a sealing cap may be used during subsea conditions to help prevent (although not well) dirt and corrosion around the pins. O-ring seals or similar shapes may be built into the bulkhead connector to provide a seal against the pressure cap, and over time and with multiple connections/disconnections they are often damaged or scored. Prior art connectors can also be difficult to connect as every pin typically has an O-ring shape associated with it that act as reactive pistons compressing air during the connection. If the air is expelled in the connection process, they create a resistive vacuum force when they are separated.

Typical bulkhead connectors, plugs, and other data/power couplers on autonomous seismic nodes are prone to corrosion, sealing, and alignment issues and require a significant amount of time and energy to make a secure connection. Further, the conductor pin and socket design can be hard to reliably clean if the electrical contacts in the connector become contaminated with seawater or other abrasive debris. Still further, typical connector designs can only withstand a certain amount of connections, after which they must be discarded or substantially refurbished, which is hard, expensive, and time-consuming to do.

During deployment, the connector may be fitted with a sealing cap or pressure cap or other molded form shape to limit pressure and water exposure for the electrical connection. Such pressure caps typically have to be removed on board a vessel prior to separately connecting the power/data connector. Likewise, prior to deployment subsea, the pressure cap needs to be re-inserted. Conventional pressure caps do not seal effectively and are hard to install and remove. In general, pressure caps are threaded such that corresponding threads on the bulkhead connector, when engaged, provide a seal. Each end typically comprises threads such that the male end may be coupled to the female end by engaging (e.g., rotating) the threaded ends together. Further, the typical connector assemblies comprise seals (such as O-rings or molded rubber shapes to include an O-ring type profile) in locations that are easily damaged and hard to replace. These seals can be damaged by fine scores and lose their sealing capacity with frequent connection or disconnection in the presence of abrasive contaminants suspended in the sea water. Once damaged, O-rings and other seals can be difficult to change, if they are serviceable at all, and require skilled operators. If conventional seals for connector assemblies are damaged, it typically requires the whole connector or cable to be replaced. Overall, conventional plugs can lead to inefficiency, reliability problems, and operating errors, as well as increased expenses after the failure of the connector assembly.

A need exists for an improved method and system for data and/or power transfer to autonomous seismic nodes, and in particular one that allows for the rapid coupling of connectors and plugs to an ocean bottom autonomous seismic node, has reliable performance over a large number of connection and disconnection cycles, and is easily repaired. A need exists for a maintenance free and fail-safe connector. A need also exists for an easier way to connect external electronic devices to an autonomous seismic node for subsea operations.

SUMMARY

Apparatuses, systems, and methods for data and/or power transfer to and from an ocean bottom seismic node are described. In an embodiment, an autonomous seismic node is configured with a bulkhead connector assembly that may be coupled to a connection plug assembly for data and/or power transfer and a pressure cap assembly when utilized subsea. A plurality of pins may be located on the bulkhead assembly in a substantially flat contact surface to obtain an external electrical connection to the node. A quick release assembly and/or locking ring may be utilized to fasten the pressure cap assembly and/or plug assembly to the bulkhead connector assembly. The pins on the bulkhead assembly may form a flat contact surface and/or circuit with an external device, such as a plug connection assembly or pressure cap assembly. One or more external devices may be coupled to the pressure cap assembly and/or or bulkhead connector for increased functionality to the node. The bulkhead assembly connection may be used in applications besides autonomous seismic nodes, such as other subsea operations and any other application where a better coupling is utilized by the use of a flat contact surface or circuit, such as any environment in which it is hard to make an electrical connection, that is exposed to harsh or corrosive conditions, and/or when dirt or debris is an issue, such as in desert or low or high pressure applications.

In one embodiment, the disclosed autonomous seismic node comprises a pressure housing such that at least one seismic sensor, at least one data recording unit, and at least one clock are located within the pressure housing, and a bulkhead connector coupled to the housing configured to receive an external device, wherein the bulkhead connector comprises a flat contact surface configured to transfer power or data with the external device. The bulkhead connector may have a plurality of flat electrical contact surfaces disposed on the flat contact surface, which may include at least eight separate surfaces. The bulkhead connector may have a plurality of pins, wherein each pin has a body portion and a head portion, wherein the head portion is configured to be substantially flush with the flat contact surface. Each of the pins may have one or more O-ring seals.

The bulkhead connector may have a housing and a connector insert, wherein a first end of the connector insert comprises the flat contact surface, wherein the connector insert comprises one or more O-ring seals. The housing may be configured to receive the external device within an interior of the housing. The bulkhead housing may have no seals that engage with and/or seal against the external device. The bulkhead connector may have one or more LEDs configured to display a status of the node or be used for high-speed communication. The bulkhead connector may have one or more optical windows configured to transmit data between the node and the external device. The bulkhead connector may be configured to attach to the external device with a quick release attachment mechanism. Such a quick release attachment mechanism may be configured to lock the external device to the bulkhead connector with a resistive force, such as air pressure or spring force applied from the external device.

The external device can be selected from a plurality of different electronic components or coupling devices, depending on the needs of the particular seismic survey. Such external devices can be utilized during subsea operations and/or during operations on the back deck of a marine vessel. For example, the external device may be selected from the following group: hydrophone, accelerometer, transponder, acoustic modem, Wi-Fi antenna, and one or more battery packs.

For example, the external device may be a protective pressure cap configured for subsea deployment. The pressure cap may be configured to attach to the bulkhead connector by a quick attachment mechanism. The pressure cap may have one or more O-ring seals configured to seal against an interior housing portion of the bulkhead connector, and such seals may be also configured to sweep the bore of the bulkhead connector to substantially remove any moisture or debris from the bore. The pressure cap may have a first end that is configured to be inserted into the bulkhead connector, wherein the end is substantially flat and configured to be adjacent to the flat contact surface of the bulkhead connector. The pressure cap may comprise a cavity that is used to control the resistive pressure of the cap. The pressure cap may also comprise one or more recesses configured to couple with an attachment tool for removing the pressure cap from the bulkhead connector.

As another example, the external device may be a plug assembly coupled to a second external device. The plug assembly comprises a plurality of pins configured to contact a plurality of flat electrical contact surfaces located on the bulkhead connector, wherein each of the plurality of pins is spring loaded. Each of the plurality of pins may be configured to retract into the plug assembly when the plug is inserted into the bulkhead connector. The plug assembly is configured to attach to the bulkhead connector by a quick release attachment mechanism.

As another example, the external device is a pressure cap with a cavity configured to hold a payload device during subsea operations. The payload device may be a transponder, a hydrophone, and any number of other electronic devices. The external device may be also be an oil filled tube coupled to a second external device.

Also disclosed is a system for transferring data with an autonomous seismic node, comprising a housing for an autonomous seismic node, wherein at least one seismic sensor, at least one data recording unit, and at least one clock are located within the housing, a bulkhead connector coupled to the housing, wherein the bulkhead connector comprises a flat contact surface configured for data or power transfer, and an electronic device configured to attach to the bulkhead connector during subsea operations. The bulkhead connector may comprise a first substantially flat contact surface configured to transfer data with the electronic device. The system may also comprise a plurality of electronic devices, each of which is configured to attach to the bulkhead connector during different subsea operations. The electronic device comprises a second substantially flat contact surface configured to transfer data with the external device. The electronic device may comprise a pressure cap assembly coupled to a first external device. The electronics device may be a plug assembly.

Also disclosed is a system for transferring data with a subsea device. The subsea device may comprise an autonomous seismic node or any other subsea device. The system may comprise a housing for a subsea device, wherein a plurality of electronic components is located within the housing, a bulkhead connector coupled to the housing, wherein the bulkhead connector comprises a flat contact surface configured for data or power transfer, and an electronic device configured to attach to the bulkhead connector during subsea operations.

Also disclosed is a method for transferring data or power from an external device to an autonomous seismic node, comprising inserting an external device into a bulkhead connector on an autonomous seismic node, forming a flat circuit between the external device and the bulkhead connector, and transferring data or power between the external device and the autonomous seismic node through the flat circuit. The bulkhead connector may comprises a housing and a substantially flat contact surface configured for data or power transfer. The method may further comprise locking the plug to the bulkhead connector with resistive force applied by the bulkhead connector. The resistive force may be air pressure or spring force. In one embodiment, the data or power transfer is performed subsea, while in other embodiments it is performed on the back deck of a marine vessel.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1A:
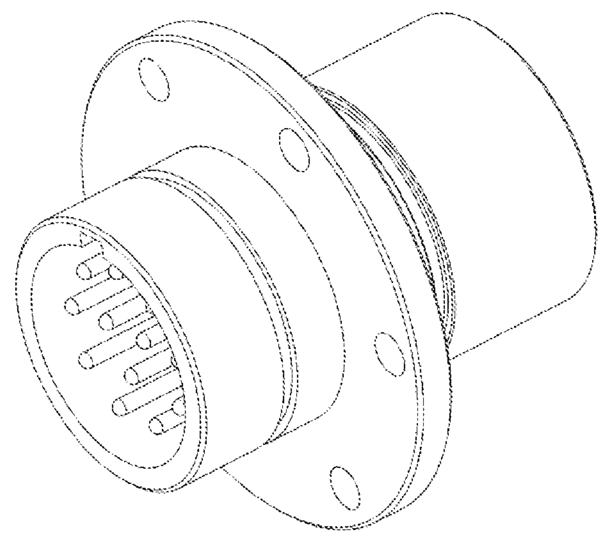
FIG. 1A illustrates a conventional bulkhead connector of an autonomous seismic node as found in the prior art.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Seismic Node Deployment

In one or more embodiments, the disclosed data and/or power connector coupler may be utilized in conjunction with any autonomous marine seismic node. Methods of deployment of autonomous seismic nodes from a marine vessel to the seabed is well known in the art.

As mentioned above, ocean bottom nodes (OBNs) can be placed on the seabed in a variety of different mechanisms. In one embodiment, one or more marine vessels deploy and recover a cable (or rope) with attached OBNs according to a particular survey pattern. For example, Applicant's U.S. Patent Publication No. 2015/0362606, incorporated herein by reference, discloses one method of directly attaching nodes to a deployment cable and then deploying that cable over the back deck of a marine vessel to the seabed. Other methods are also well known in the art. In other embodiments, rather than using sensors or nodes directly attached to a deployment line, the nodes can be placed by a tethered remotely operated vehicle (ROV) on the seafloor, as is known in the art, such as that described in U.S. Pat. No. 6,975,560, incorporated herein by reference. With this method, a marine vessel will typically have one or more ROVs and a plurality of OBNs, and may separately or in conjunction lower the ROVs and OBNs close to the seabed. The ROV then individually places each node on the seabed in the desired location. When the nodes are to be removed from the seabed, the nodes can be recovered by an ROV and received by the surface vessel with a variety of mechanisms. In still other embodiments, an OBN may be part of and/or coupled to an autonomous underwater vehicle (AUV), such that the AUV (and node/sensor) is steered from a marine vessel or other subsea location to the intended seabed destination for the survey and data recording, as described in U.S. Publication No. 2013/0083624, incorporated herein by reference. Once the survey is complete, the AUVs can either be recovered and/or steered back to the marine vessel for data downloading of the nodes and seismic data. The disclosed power and/or data coupling device is not necessarily limited to the method of deployment to or retrieval from the seismic node and the seabed.

Autonomous Node Design

Figure 2A:
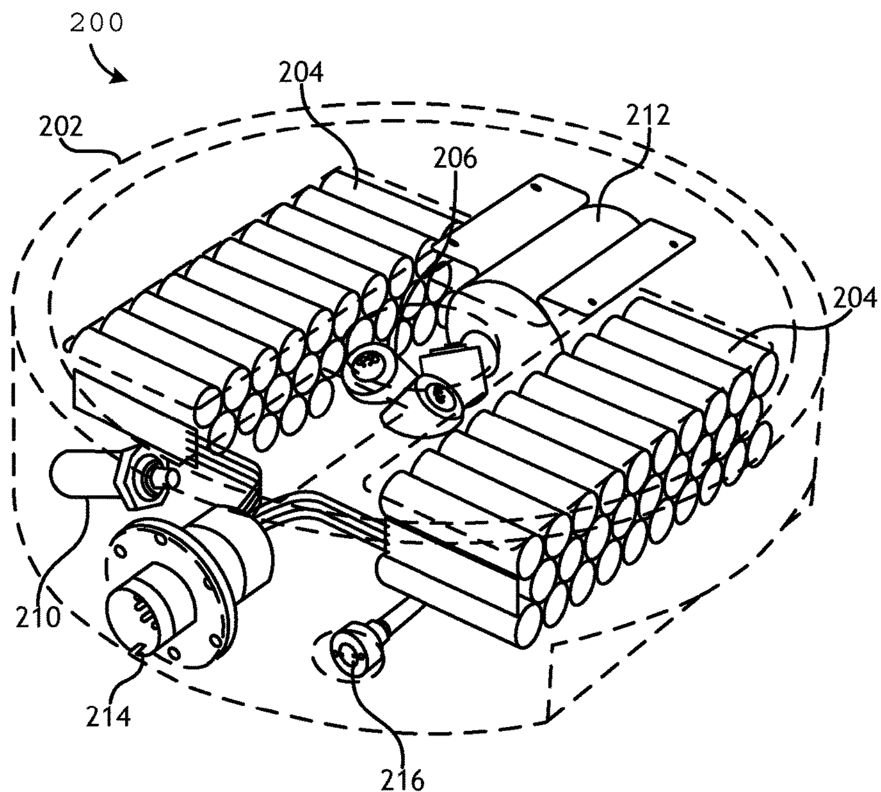
FIG. 2A illustrates a perspective view diagram of one embodiment of an autonomous seismic node.
Figure 2B:
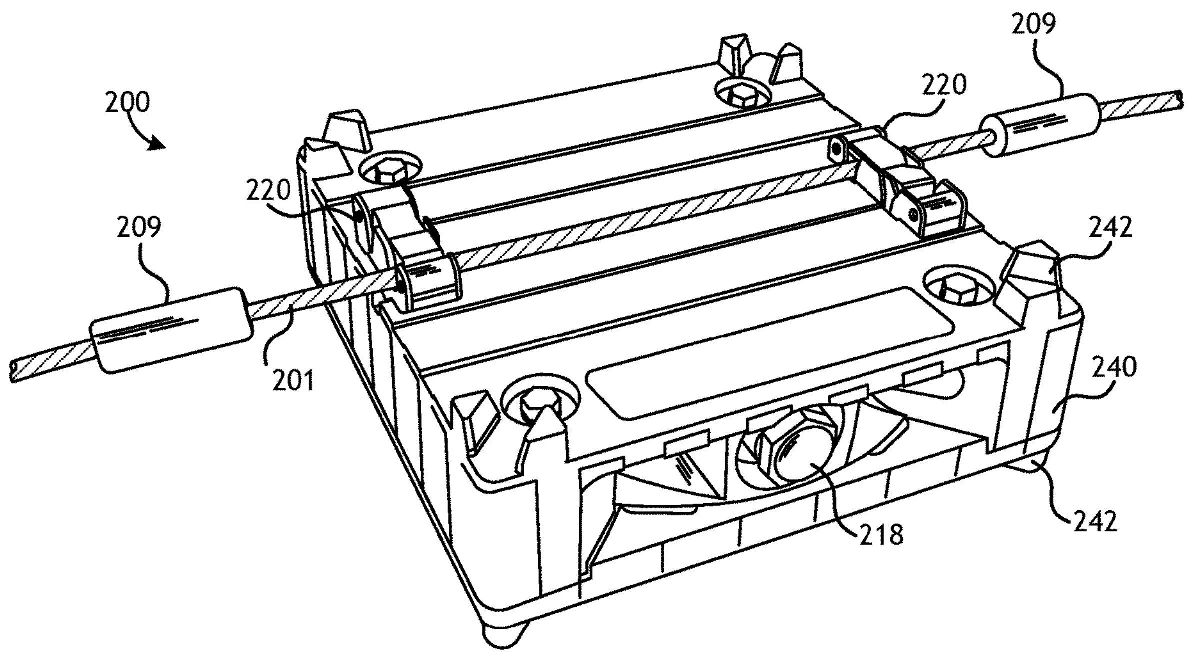
FIG. 2B illustrates a perspective view diagram of another embodiment of an autonomous seismic node.

FIGS. 2A and 2B illustrate various embodiments of an autonomous seismic node that may be utilized with the disclosed flat contact quick connect coupling device.

FIG. 2A illustrates a perspective view diagram of autonomous ocean bottom seismic node 200. Seismic node 200 may include body 202, such as a housing, frame, skeleton, or shell, which may be easily dissembled into various components. Additionally, seismic node 200 may include one or more power sources 204. Additionally, the seismic node may include pressure release valve 216 configured to release unwanted pressure from seismic node 200 at a pre-set level. The valve protects against fault conditions like water intrusion and outgassing from a battery package. Additionally, the seismic node may include electrical connector 214 (such as a bulkhead connector housing) configured to allow external access to information stored by internal electrical components, data communication, and/or power transfer. During the deployment the bulkhead connector housing is covered by a pressure proof watertight cap 218 (shown in FIG. 2B). In the prior art, an external connector (such as that shown as element 214 in FIG. 2A) is typically the standard way to charge a node by a separate plug that must be manually inserted into the bulkhead assembly and mate with the plurality of protruding pins seated in individually matching sockets in the external plug or pressure cap. While the bulkhead connector 214 shown in FIG. 2A is similar to the prior art bulkhead connector design shown in FIG. 1A (with protruding pins), the disclosed quick connect data and power connection of this application may be utilized in place of the prior art 214 electrical connector in similar function. In other embodiments, there may be multiple bulkhead connectors on the node, such as one for data transfer and one connector for power transfer, or multiple connectors for different external devices.

In an embodiment, the internal electrical components of the node may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in seismic node 200. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures and other corrosive seabed conditions at the bottom of the ocean, as is well known in the art. In an embodiment, the seismic node includes one or more components configured for wireless transmission of data to and from the node via electromagnetic, acoustic, inductive or optical components. Data can be retrieved from the node during deployment or, more preferably, from the node while the node is in a workstation or container on board the marine vessel.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing (such as housing 202) that contains all of the node's internal components. In another embodiment, the pressure housing is partially and/or substantially surrounded by a non-pressure housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external envelope or housing 240. Various portions of non-pressure housing 240 may be open and expose the pressure housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressure node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each external housing may be made of a durable material such as rubber, plastic, carbon fiber, or metal, and in one embodiment may be made of polyurethane or polyethylene. In still other embodiments, the seismic node 200 may include a protective shell or bumper configured to protect the body in addition to or in lieu of external housing 240. One embodiment of coupling case 240 is more fully disclosed in Applicant's U.S. Patent Publication No. 2016/0041280, incorporated herein by reference.

In one embodiment, seismic node 200 comprises one or more direct attachment mechanisms and/or node locks 220, as described in more detail in U.S. Patent Publication No. 2015/0362606, incorporated herein by reference, that may be configured to directly attach tightly or loosely seismic node 200 to deployment line 201, and in some embodiments may allow for free rotation of the node around the deployment line and the ability for the nodes to slide between adjacent ferrules or stoppers 209. The node locks (and attached nodes) may be coupled to and decoupled from the deployment line via a node deployment system, as described in more detail in U.S. Patent Publication No. 2016/0041284, incorporated herein by reference. Of course, the node of the disclosed embodiment need not be directly or indirectly coupled to a deployment cable, and may be placed individually on the seabed without use of a deployment cable.

Those skilled in the art would appreciate that more or less modules or components may be added to or removed from the node based on the particular needs of the node and/or seismic survey.

Autonomous Underwater Vehicle

In one or more embodiments, the disclosed quick connect coupling device may be utilized in conjunction with an autonomous underwater vehicle (AUV), such as that described in Applicant's U.S. Pat. No. 9,090,319, incorporated herein by reference. In one embodiment, the AUV may be a seismic AUV, such that the autonomous seismic node is incorporated into the autonomous underwater vehicle. Methods of deployment of such AUVs (and of their configurations) to the seabed is well known in the art. Again, the coupling device is not necessarily limited to the method of deployment to or retrieval from the seismic node and the seabed.

Figure 3:
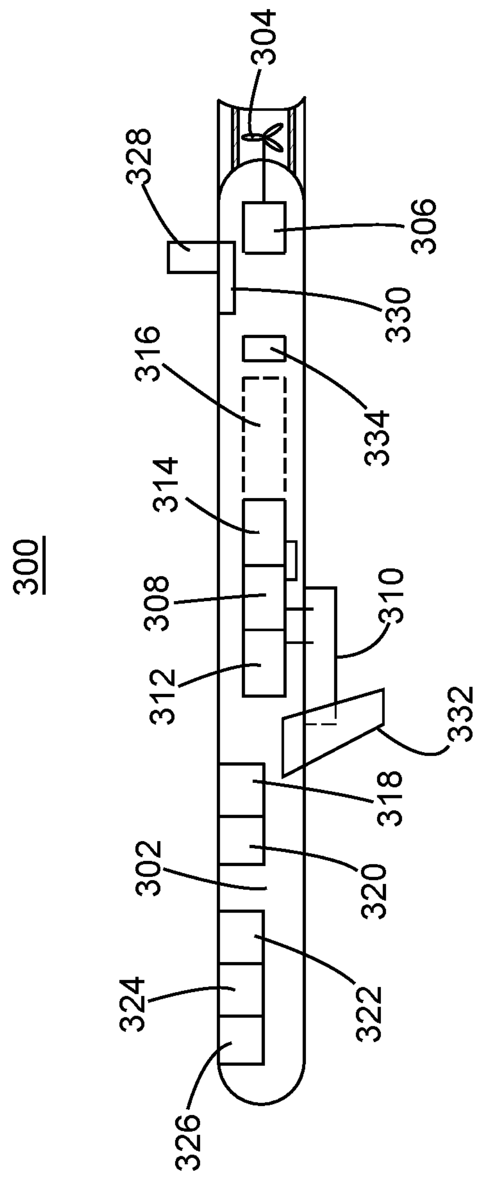
FIG. 3 illustrates one embodiment of a schematic diagram of an AUV.

FIG. 3 illustrates one embodiment of an AUV having a body 302 to which a propulsion system is attached, such as one or more propellers 304. A motor 306 inside the body 302 activates propeller 304. Other propulsion systems may be used, e.g., jets, thrusters, pumps, etc. Alternatively, the propulsion system may include adjustable wings for controlling a trajectory of the AUV. Motor 306 may be controlled by a processor/controller 308. Processor 308 may also be connected to a seismic sensor 310. Seismic sensor unit 310 may have a shape such that when the AUV lands on the seabed, the seismic sensor achieves a good coupling with the seabed sediment. The seismic sensor unit may include one or more of a hydrophone, geophone, accelerometer, etc. For example, if a 4C (four component) survey is desired, the seismic sensor unit 310 may include three accelerometers and a hydrophone, i.e., a total of four sensors. Alternatively, the seismic sensor unit may include three geophones and a hydrophone. Of course, other sensor combinations are possible, and some of these sensor components may be external to the body of the node and coupled via a connector (such as via the disclosed bulkhead connector and quick connect assembly). In some embodiments, seismic sensor unit 310 may be located entirely within the body of the AUV, and in other embodiments some or all of the seismic sensor unit may protrude from or be located outside of body 302. Other passive or active devices can be deployed external to the node/AUV that may be connected by an underwater cable or plugged directly into the bulkhead connector to provide some additional functionality to the node/AUV. A memory unit 312 may be connected to processor 308 and/or seismic sensor 310 for storing a seismic sensor's 310 recorded data. A battery 314 may be used to power all these components. AUV 300 may also comprise a portion that is a pressure vessel 340, which may contain some or all electronics and components that need to be contained within a pressure housing. While not shown in FIG. 3, AUV 300 would include an external connector for data and/or power transfer or other external components, similar to connector 214 in FIG. 2A, which may also be used for connecting external devices during deployment or on board the vessel.

The AUV may also include an inertial navigation system (INS) 318 configured to guide the AUV to a desired location. Besides or instead of INS 318, the AUV 300 may include a compass 320 and other sensors 322 such as, for example, an altimeter for measuring its altitude, a pressure gauge, an interrogator module, etc. The AUV may optionally include an obstacle avoidance system 324 and a communication device 326 (e.g., Wi-Fi device, a device that uses an electromagnetic link) or another data transfer device capable of wirelessly transferring data such as inductive, acoustic or optical links. One or more of these elements may be linked to processor 308. The AUV further includes an antenna 328 (which may be flush with the body of the AUV) and a corresponding acoustic system 330 for subsea communications, such as communicating with the deploying, shooting, or recovery vessel (or other surface vessel) or an underwater base/station or another AUV or ROV. For surface communications (e.g., while the AUV is on a ship), one or more of antenna 328 and communication device 326 may be used to transfer data to and from the AUV. Stabilizing fins and/or wings 332 for guiding the AUV to the desired position may be used together with propeller 304 for steering the AUV. However, in one embodiment, the AUV has no fins or wings. The AUV may include a buoyancy system 334 for controlling the AUV's depth and keeping the AUV steady after landing. Some of the functionality described above for an AUV may be provided using an external device coupled to the AUV via the disclosed bulkhead connector and quick connect assembly, or some other custom external port.

Those skilled in the art would appreciate that more or less modules or components may be added to or removed from the AUV based on the particular needs of the AUV and/or seismic survey.

Node Connector

Figure 1B:
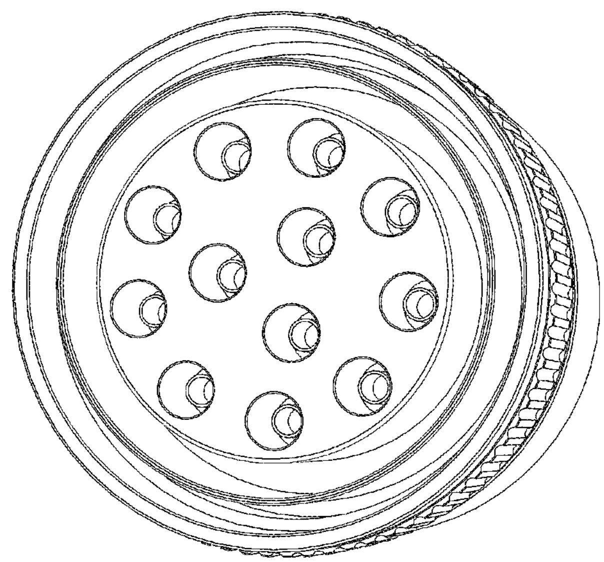
FIG. 1B illustrates a conventional sealing/pressure cap configured to mate with the bulkhead connector of FIG. 1A as found in the prior art.

As discussed above, electrical/power connectors and other bulkhead connectors have been used for data and/or power transfer to an ocean bottom seismic node. Such conventional connectors (such as that shown in FIGS. 1A and 1B) are problematic for a variety of reasons, as described above. The disclosed embodiment provides a novel solution to one or more of the industry's needs previously described herein and offers advantages over conventional bulkhead connectors and electrical/power for autonomous seismic nodes. While the embodiments described herein are focused on an autonomous ocean bottom seismic node, one of ordinary skill in the art will quickly realize that the disclosed electrical/power connecting device can be used in a wide variety of applications for where a better coupling is utilized by the use of a flat circuit, such as any environment in which it is hard to make an electrical connection, that is exposed to harsh or corrosive conditions, and/or when dirt or debris is an issue, such as in desert, subsea, or airplane applications.

In one embodiment, an autonomous seismic node is configured with a bulkhead connector assembly that may be coupled to an external device for data and/or power transfer. In one embodiment, a connection assembly may thus include both the bulkhead connector assembly and the external device assembly. The external device may be a plug assembly, a pressure cap assembly, a connector assembly to a separate electronic device either connected by cable or built into the pressure cap, or simply any electronic device configured with the appropriate connecting mechanism for the bulkhead connector. The bulkhead connector may also be configured to receive a protective, sealing, and/or pressure cap assembly when utilized subsea. Thus, any one or more passive or active devices can be deployed external to the node for subsea operations, such as any external device that may be connected by an underwater cable or plugged directly into the bulkhead connector to provide additional functionality to the node.

In one embodiment, the bulkhead connector comprises a substantially flat electrical contact surface, which is in stark contrast to the prior art connector assemblies that require a male side and a female side of any data/power connection. The flat surface may be configured to couple with an external plug assembly and/or electronic device for power and/or data coupling to the node. In one embodiment, the bulkhead connector and/or the external plug connector may include a plurality of pins to make the power and electrical connections. A quick connection/release assembly and/or locking ring may be utilized to fasten the external device, plug assembly, and/or pressure cap assembly to the bulkhead connector assembly in a quick and easy fashion. Each of the bulkhead connector assembly, plug assembly, and pressure cap assembly may have one or more sealing elements to protect against extreme pressure and/or water conditions, particularly those existing on the bottom of the ocean. In other embodiments, a pressure cap assembly may include an external electronic device within the pressure cap assembly for subsea operations that is coupled to the node electronics via the bulkhead connector assembly. In still other embodiments, a pressure cap assembly may be coupled to an external device outside of the pressure cap assembly and electrically and/or optically couple the external device to the node electronic or optical circuits.

The disclosed bulkhead connector assembly requires significantly less time and energy to make a secure connection with a plug assembly for power and/or data transfer to and from the node. The bulkhead connector assembly provides an enhanced protection against sealing issues and better protects the connection (and node) from water and pressure conditions existing subsea. In addition to other benefits, the described bulkhead connector assembly is configured to more easily guide and align an external connecting device to the bulkhead connector (such as a plug or pressure cap) than prior art bulkhead connectors, particularly due to the lack of individual pin socket keying on each pin contact. One aspect of the described bulkhead connector assembly requires only twisting and not pushing to mate with an external connecting device, as opposed to prior art bulkhead connectors which required both pushing and twisting to engage the threaded locking ring. The pushing required in prior art connectors becomes much harder when there is significant back pressure on each individual pin-socket mating pair, particularly due to the presence of air in the connector assembly. If the air is expelled in the connection process in these prior art connecting devices, this will also create a resistive vacuum force when they are separated. Further, as compared to the prior art, the inside surface (the connecting surface) of the bulkhead assembly has no O-rings; instead, the O-rings are found on the connector insert and pressure cap, which provides less maintenance to the bulkhead assembly and easier access and maintenance to the seals (O-rings) on the pressure cap that may be damaged. Thus, the bulkhead connector assembly has no moving or consumable parts and any contamination by seawater or debris can be easily removed using fresh water and a small brush. Any parts that may fail and/or other replaceable components as part of the connection to the bulkhead connector assembly are located on the external plug side (or pressure cap side) instead of the bulkhead connector assembly. Such components—by being on the plug side of the power/data connection—may be replaced or cleaned easily.

Overall, the disclosed bulkhead connector assembly provides for significantly less maintenance issues than prior art designs. It also provides for fail-safe operation even if the pressure cap fails during subsea deployment. In one embodiment, the electrical connection may comprise a flat circuit and/or flat contact surface that provides a large contact area for any electrical connections. This flat contact circuit provides many benefits, such as easier cleaning, fail-safe operations, and more alignment tolerance for the electrical connection. For example, the flat contact/circuit of the electrical connection is configured with inert materials such that it may be exposed to salt water, dirt, and debris (if the pressure cap is removed or is broken) and still function. The flat contact/circuit is likewise easily cleaned when retrieved on board of a marine vessel. Still further, one or more of the electrical pins (such as in an opposite mating device, such as on the pressure cap assembly or plug assembly) may be coupled to a spring, which provides better contact of the electrical connection through the application of a steady contact force against an electrical contact surface while providing self-cleaning of the contact surfaces by the gentle friction between the parts as they mate.

Figure 4A:
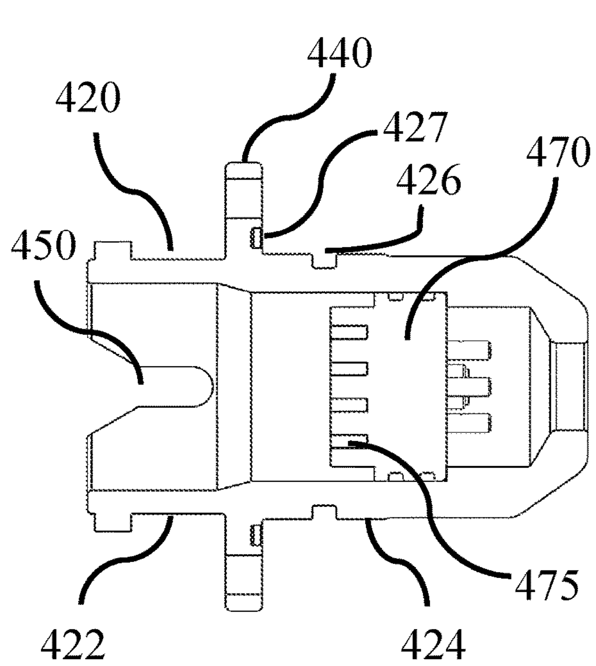
FIGS. 4A-D illustrate various perspectives of one embodiment of a bulkhead connector assembly.
Figure 4B:
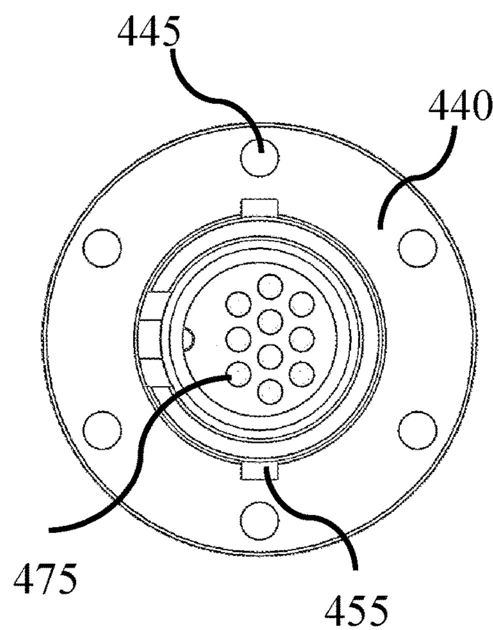
Figure 4C:
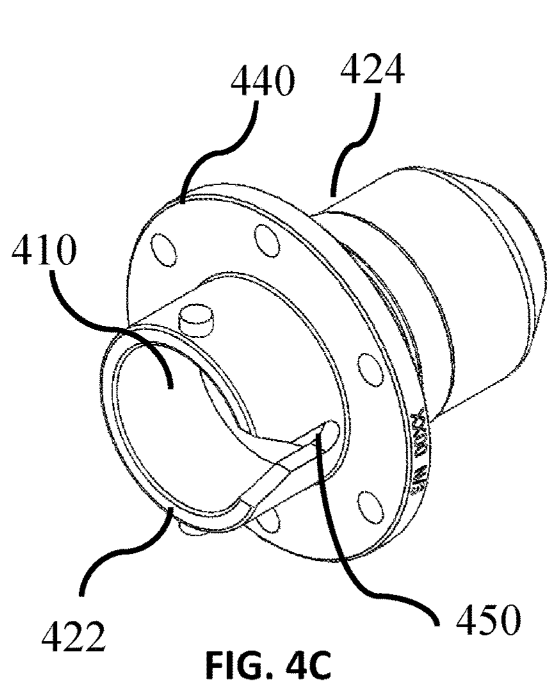
Figure 4D:
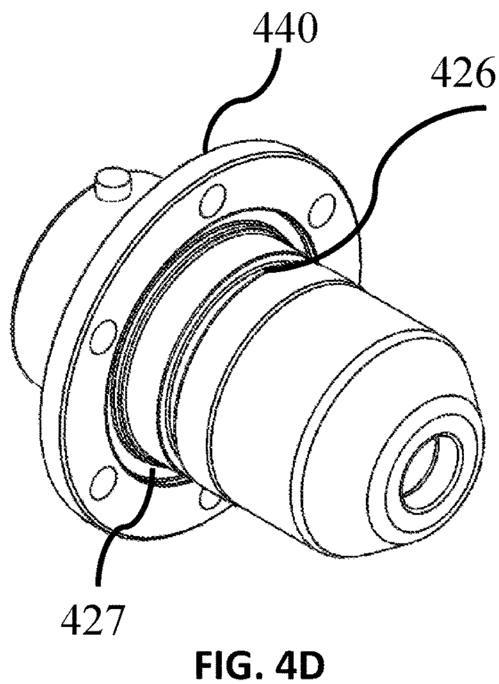

FIGS. 4A-D illustrate various perspectives of one embodiment of the disclosed bulkhead connector assembly 400 that may be fitted to an autonomous seismic node, such as node 200 or seismic AUV 300. FIGS. 4A and 4B illustrate a side and front view of bulkhead connector 400, respectively. FIGS. 4C and 4D illustrate perspective views of bulkhead connector 400 from a front and rear perspective, respectively. In one embodiment, bulkhead connector assembly 400 comprises bulkhead housing 420 and bulkhead connector insert 470. Housing 420 may be a substantially cylindrical metallic housing that forms inner cavity 410 and in one embodiment may be formed of titanium. Housing 420 may comprise circular flange 440 on an exterior portion of the housing that separates outer housing portion 422 from inner housing portion 424. In one embodiment, a portion of bulkhead connector 400 (such as inner housing portion 424) is configured to be installed within a pressure housing or chamber of a node and a portion of connector 400 (such as outer housing portion 422) is located on the outside of the node. In some embodiments, a portion of outer housing portion 422 may also be located within an external bumper/fender/housing (such as non-pressure housing 240) of the node. In one embodiment, flange 440 comprises a plurality of holes or recesses 445 configured to receive a fastener (such as a screw or bolt) to couple bulkhead connector assembly 400 to the node. Outer housing 422 may include one or more keys/notches 450 and one or more guiding pins 455, both of which provide a guided path for easier alignment and attaching of any external device to the bulkhead housing, such as a connector plug, pressure cap, or other similar device, including external devices coupled to the pressure cap. In some embodiments, only notches 450 are utilized for alignment purposes, while in other embodiments, only guiding pins 455 are utilized for alignment purposes. As shown in FIG. 4C, notch 450 may be angled, which provides more connection tolerance and less alignment issues as compared to prior art attachment devices, which typically have a narrow slot or notch in which the plug or pressure cap must be carefully inserted/aligned before pushing into the bulkhead connector. Notch 450 comprises a first side or portion that is significantly larger as compared to a second side or portion. In one embodiment, one or more guide pins 455 (such as two) may be equally spaced apart around outer housing 422 and are sized to mate with one or more openings on a locking ring (discussed in more detail below). In another embodiment the guide pins can be located asymmetrically to form a unique key to fix the connector or external device orientation if there is no separate free rotating locking ring on the plug. The exterior of housing 420 may comprise one or more concentric grooves, with groove 426 being located on inner housing 424 and groove 427 being located on flange 440, configured to receive sealing elements (e.g., O-rings). In one embodiment, the inner surface of housing 420 (as well as cavity 410) has no sealing elements or O-rings. Any interior sealing elements are instead located on an exterior device (such as a plug assembly, pressure cap, connector insert or other external device) that is inserted into cavity 410. Accordingly, the maintenance of housing 420 (and particularly related to the cleaning of cavity 410) is significantly decreased as compared to prior art connector devices. Other shapes and configurations of housing 420 fall within the scope of the invention.

Housing 420 may be configured to receive connector insert 470 within cavity 410. In one embodiment, connector insert 470 may comprise an electrical socket or other insert with a plurality of metallic pins 475 that are flush or substantially flush with an end face of connector insert 470. Pins 475 may be made of brass, steel, copper, or other conductive material and may be plated with gold, silver or other plating materials. Pins 475 may be arranged in a variety of configurations and need not be arranged symmetrically around the end face of the socket. Each of the plurality of pins 477 or contact surfaces may be directly or indirectly connected or coupled to one or more of the node's power supply, data recorder, fiber, coaxial, and/or electronic circuits (such as by a wire connection, not shown). Some configurations may electrically connect each of the plurality of pins 475 external and downstream from insert 470 prior to connecting with the node's electronics and/or components. In one embodiment, each of the plurality of pins 475 is not uniform in size (some are larger than others) and one or more pins may be configured to receive a particular type of data. For example, one or more of the plurality of pins 475 may be configured to receive power to charge the node while one or more of the remainder of the plurality of pins 475 may be configured to exchange data communications between the node and an external device. In one embodiment, bulkhead connector insert 470 comprises at least one pin through which power and data transfer may occur, and the exterior casing or housing of connector insert 470 may comprise an additional conductive point for a ground. In another embodiment, the plurality of pins 475 may comprise ten pins: two pins may be utilized for power (one is for a positive connection and one is for a negative connection) and eight pins may be used for data transfer. In one embodiment, the eight data transfer pins of the plurality of pins 475 are arranged for high speed Ethernet synchronized data transfer using the IEEE 1588 protocol (or other similar protocol), which provides for a high data transfer rate of 1 Gb/s. For data and/or power transfer between node 200 and an external device or system, a corresponding/mating plug connector insert (shown in FIGS. 7A, 7B, and 8A) can be inserted into cavity 430 of bulkhead connector 400 for coupling to pins 475. Further, bulkhead connector insert 470 may utilize a coaxial configuration or fiber-optic connection instead of pins.

In one embodiment, the flat contact surface of the bulkhead connector may comprise other electrical, data, and/or power transfer components. For example, a sapphire window may be located on the flat contact surface in addition to (or in lieu of) a plurality of electrical contact surfaces or pins 475. The sapphire window may be configured to transmit data through the window, such as by the use of fiber optic connections disposed within the node and adjacent to the sapphire window, as more fully described in U.S. Patent Publication No. 2016/0094298, incorporated herein by reference. In such embodiments, a plug (such as plug assembly 700) or other external device may have a corresponding sapphire window for data transfer to the external device. For some applications, power may be only transferred through the electrical contacts while all data is transferred through the optical window. In still another embodiment, connector insert 470 may comprise an LED light (not shown) on a surface of the insert. The LED light may be electrically coupled to the node's electronics and/or components and may be configured to provide high-speed communication through a matching fiber in the plug or transparent window. It may also be used to blink for a period of time to show that the node is properly working (e.g., there are no operational errors to prevent seismic recording).

Figure 5A:
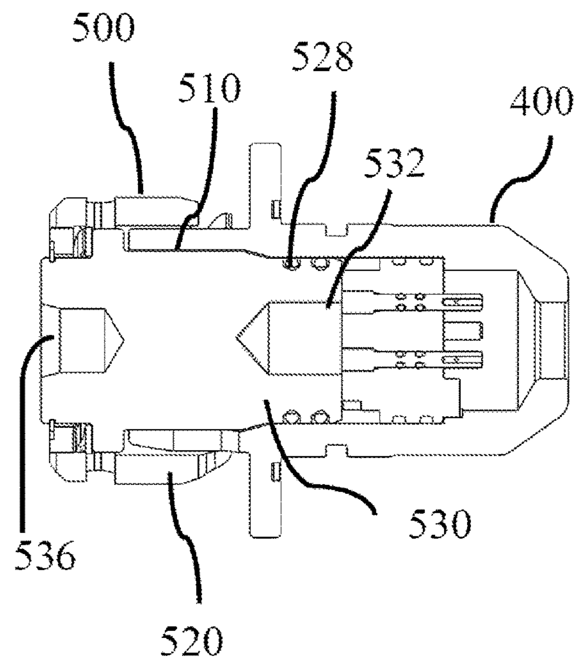
FIGS. 5A-D illustrate various perspectives of one embodiment of a bulkhead connector assembly coupled with a pressure cap assembly.
Figure 5B:
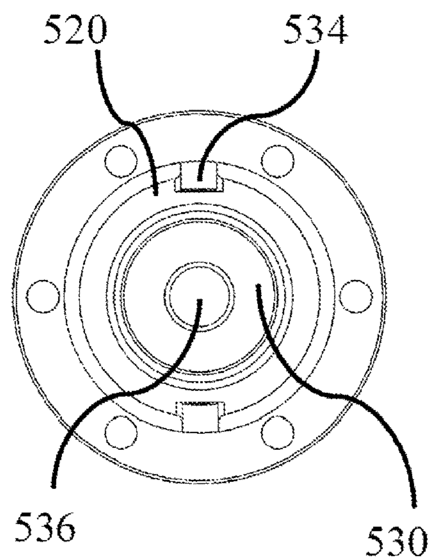
Figure 5C:
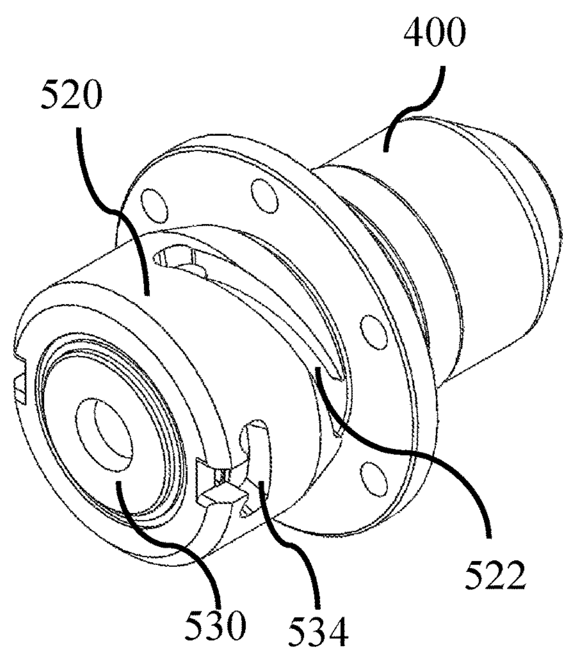
Figure 5D:
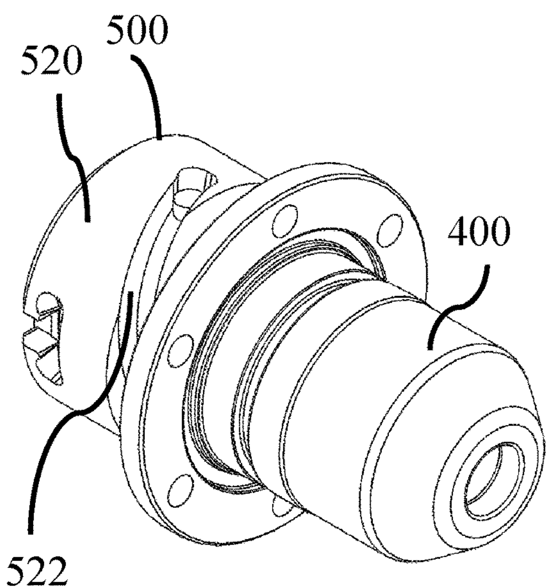

FIGS. 5A-D illustrate various perspectives of one embodiment of a bulkhead connector assembly 400 (which is the same as from FIGS. 4A-4D) coupled with a sealing and/or pressure cap assembly 500. Protection pressure cap assembly 500 is used to protect connector insert 470 and associated circuitry within bulkhead connector assembly 400 from exposure to the environment during subsea operations. In particular, pressure cap assembly 500 is used to prevent water (salinity, corrosion, etc.) and pressure conditions existing subsea from negatively affecting connector insert 470. Pressure cap assembly 500 may have one or more concentric grooves 528 configured to receive sealing elements (e.g., O-rings). Protection pressure cap assembly 500 is configured to be removed when data and/or power is transferred to/from the node by the use of a separate plug assembly. FIGS. 5A and 5B illustrate a side and front view of cap assembly 500 inserted into bulkhead connector assembly 400, respectively. FIGS. 5C and 5D illustrate perspective views of cap connector assembly 500 and bulkhead connector assembly 400 from a front and rear perspective, respectively. In one embodiment, cap assembly 500 comprises cavity 510 occupied by connector end cap 530. End cap 530 may comprise cavity or hole 532 located substantially in the center of cap 530. Hole 532 may be configured in size as a means to control the trapped air pressure within the pressure cap as it is inserted into bulkhead connector housing 400. In some configurations, hole 532 may not be required such that higher trapped air pressure can be maintained to act as a resisting spring force, thereby locking the pressure cap to the bulkhead connector. Pressure cap assembly 500 may also comprise one or more holes or recesses 534 and guide hole 536 configured to receive corresponding pins or protrusions from a tool used to help remove the pressure cap assembly 500 from the bulkhead connector, which is discussed in more detail in relation to FIG. 12. Pressure cap recesses 534 may be located on opposite sides of locking ring 520, and in one embodiment may comprise a locking slot or "T" configuration (see FIG. 5C) which allows the pins from an external tool (such as tool 1200) to be received into recess 534 and be rotated into the T configuration for locking or securing the tool to the pressure cap assembly. A substantial portion of pressure cap assembly 500 may be inserted into cavity 410 of bulkhead connector housing 400. In one embodiment, cap assembly 500 is securely fastened or coupled to bulkhead connector housing 400 by locking ring 520, which may be part of or merely coupled to pressure cap assembly 500. Locking ring 520 is configured to secure plug assembly 500 to bulkhead connector assembly 400 in a quick and efficient manner. Locking ring 520 and bulkhead housing 400 are configured such that locking ring 520 may be secured to bulkhead housing 400 by substantially twisting the ring with little to no pushing, such as by a 90 degree turn or one-quarter (¼) turn of locking ring 520. This is in contrast to prior art connections for node bulkhead housings, which require a substantial amount of work and time to screw in a plug or pressure cap assembly to the bulkhead connector housing. In one embodiment, the disclosed connection mechanism may be considered a bayonet style locking mechanism. Locking ring 520 may comprise one or more slots or openings 522 that are configured to engage guiding pins 455 as the pressure cap assembly attaches to/detaches from the bulkhead connector. In this manner, locking ring 520 serves as a quick connection/release assembly for the bulkhead connection assembly. In one embodiment, pressure cap assembly 500 is inserted and removed from bulkhead connector assembly 400 manually and in other embodiments it may be configured to couple and decouple from bulkhead connector assembly 400 via automated or semi-automated mechanisms. When the pressure cap is removed, O-rings on pressure cap assembly 500 are used to sweep any moisture or debris away from the bore of the bulkhead connector as the cap is removed.

Figure 6:
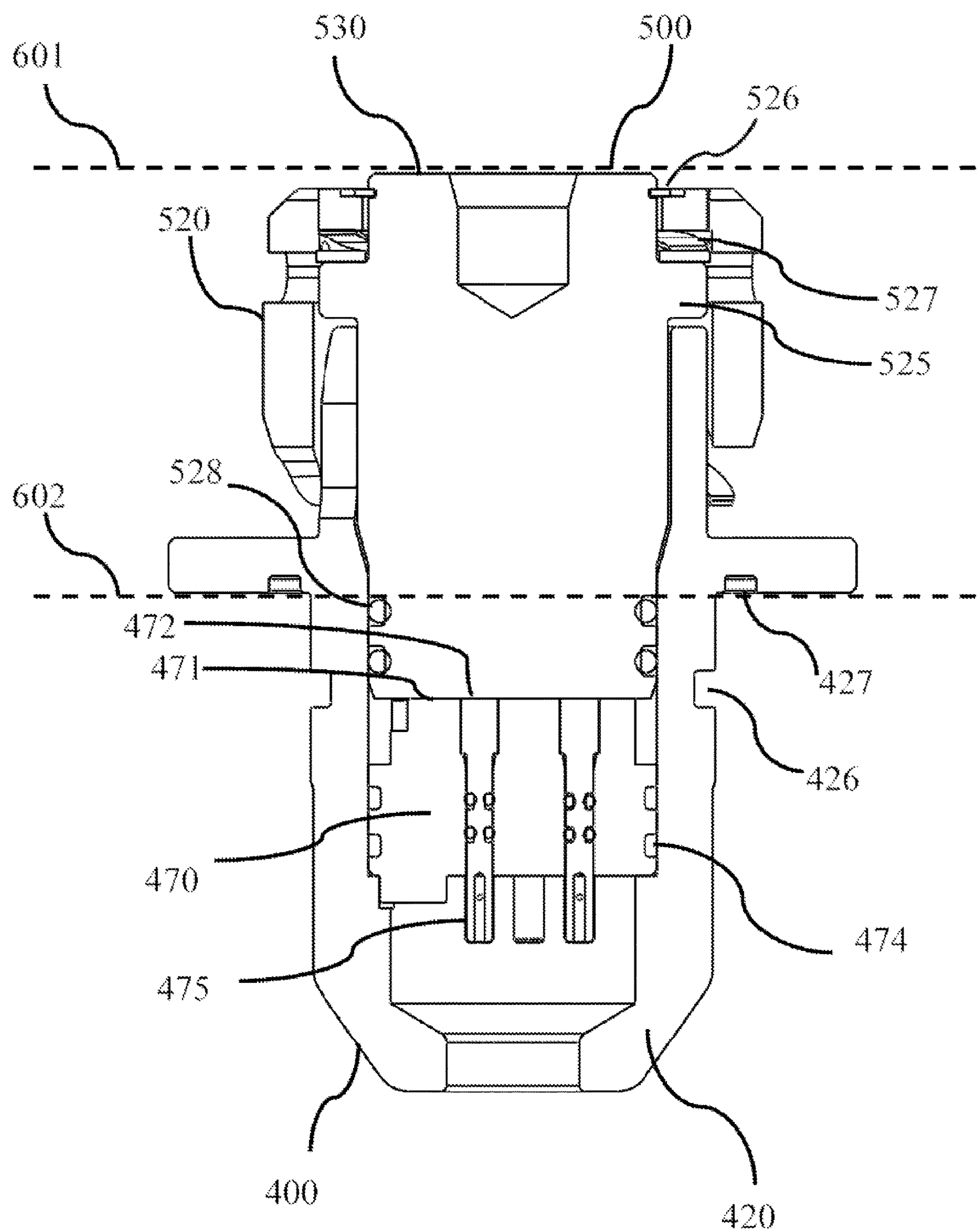
FIG. 6 illustrates one embodiment of a bulkhead connector assembly coupled to a pressure cap assembly.

FIG. 6 illustrates a detailed view of one embodiment of bulkhead connector assembly 400 coupled to pressure cap assembly 500. Similar to FIG. 5, pressure cap assembly 500 is coupled to bulkhead connector assembly 400 by locking ring 520. Connector end cap 530 of cap assembly 500 is configured to mate with and/or be placed within a cavity of bulkhead connector assembly 400. In one embodiment, the coupling arrangement between bulkhead connector assembly 400 and pressure cap assembly 500 provides a sealing configuration such that connector insert 470 is not exposed to water or pressure. Pressure cap assembly 500 may have one or more concentric grooves 528 configured to receive sealing elements (e.g., O-rings). In one embodiment, there are no sealing elements (e.g., O-rings) on the inner surface of bulkhead assembly 400, such as when used in a benign surface environment as a dust protection cap. Thus, when sealing elements inserted into grooves 528 need replacing, they can quickly be exchanged on pressure cap assembly 500. Pressure cap assembly 500 may have an enlarged lip or shoulder 525 such that one side of shoulder 525 mates against an end of bulkhead connector assembly 400 and another side of shoulder 525 mates against a lip or shoulder of locking ring 520. In one embodiment, fastening mechanism 526 (such as a Seeger, circlip or snap ring) is configured to retain the locking ring 520 to pressure cap 500. In this arrangement, shoulder 525 in conjunction with locking ring 520 and flat spring 527 helps secure a tight connection between the pressure cap assembly and the bulkhead connector assembly. Other locking mechanisms fall within the scope of this invention.

In one embodiment, and similar to FIG. 4, bulkhead connector assembly 400 comprises housing 420 and connector insert 470. Housing 420 may comprise one or more concentric grooves 426, 427 located on the exterior portion of housing 420 and configured to receive sealing elements (e.g., O-rings). Connector insert 470 may comprise one or more concentric grooves 474 configured to receive sealing elements (e.g., O-rings). Connector insert 470 may comprise a plurality of metallic pins 475 that are configured for data and/or power transfer to the node. One or more of the plurality of pins 475 may be directly or indirectly connected or coupled to one or more of the node's power supply, data recorder, and electronic circuits via wires (not shown), as is well known in the art. In one embodiment, connector insert 470 has a substantially flat contact surface 471 on an external end of the connector that is configured to be adjacent to or flush with a surface of pressure cap assembly 500 (as well as other external devices or plug assemblies, as discussed in more detail herein). Each of the plurality of metallic pins 475 may have a first end with a substantially flat contact surface 472 that is configured to be substantially flush with connector contact surface 471 and a second end that is connected to a wire (not shown) that is then connected to an electronic component of the node. In other embodiments, the plurality of pins 475 may comprise a plurality of metallic and/or glass pins that are configured for data and/or power transfer to the node using a mix of electrical circuits and fiber optic signals. One or more of the plurality of pins 475 may be directly or indirectly connected or coupled to one or more of the node's power supply, data recorder, and electronic circuits via wires or optic fibers (not shown), as is well known in the art.

In one embodiment, a portion of bulkhead connector assembly 400 is installed within a pressure housing or chamber of the node (such as pressure chamber body 202). In other embodiments, substantially all of bulkhead connector assembly 400 is installed within the pressure housing or chamber of the node. In one embodiment, fender boundary 601 marks the external edge of an external bumper/fender of a node (such as housing 240), and node housing boundary 602 marks the external edge of a pressure housing of a node (such as pressure chamber body 202). Fasteners may be inserted into a plurality of holes of bulkhead housing 400 to fasten and/or secure bulkhead connector housing 400 into the side of the node, and all or substantially all of pressure cap assembly 500 may reside within external boundary 601 of a node bumper/fender. Thus, substantially all of bulkhead connector assembly 400 and pressure cap assembly 500 may reside within the overall node/fender combination. In other embodiments, pressure cap assembly 500 may be recessed within or extrude from the node bumper/fender and/or external node housing, particularly when the pressure cap assembly may include or be connected to external electronic devices (as more further described in connection with FIGS. 14-19).

Figure 7A:
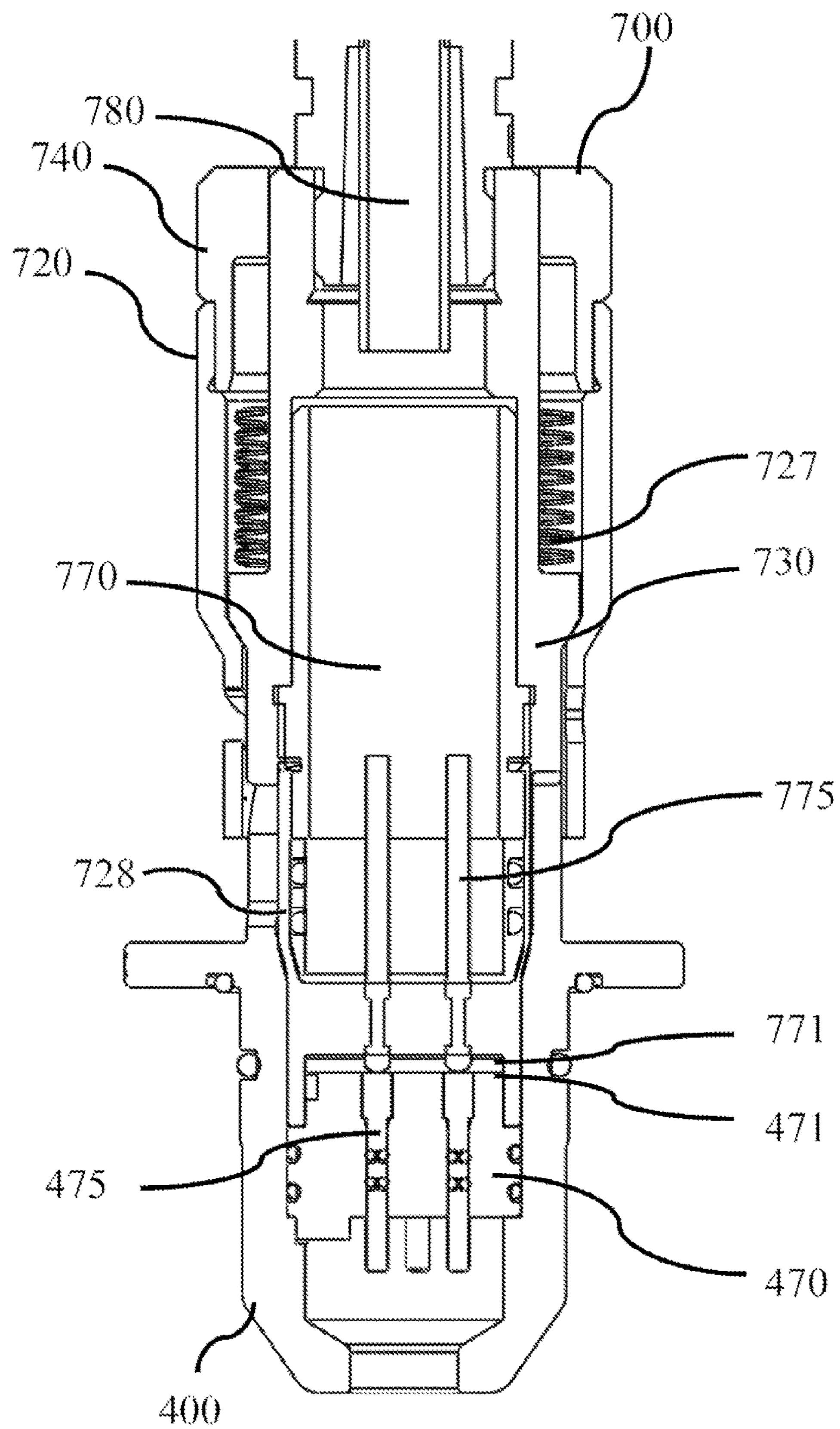
FIGS. 7A-B illustrate one embodiment of a bulkhead connector assembly coupled to a plug assembly.
Figure 7B:
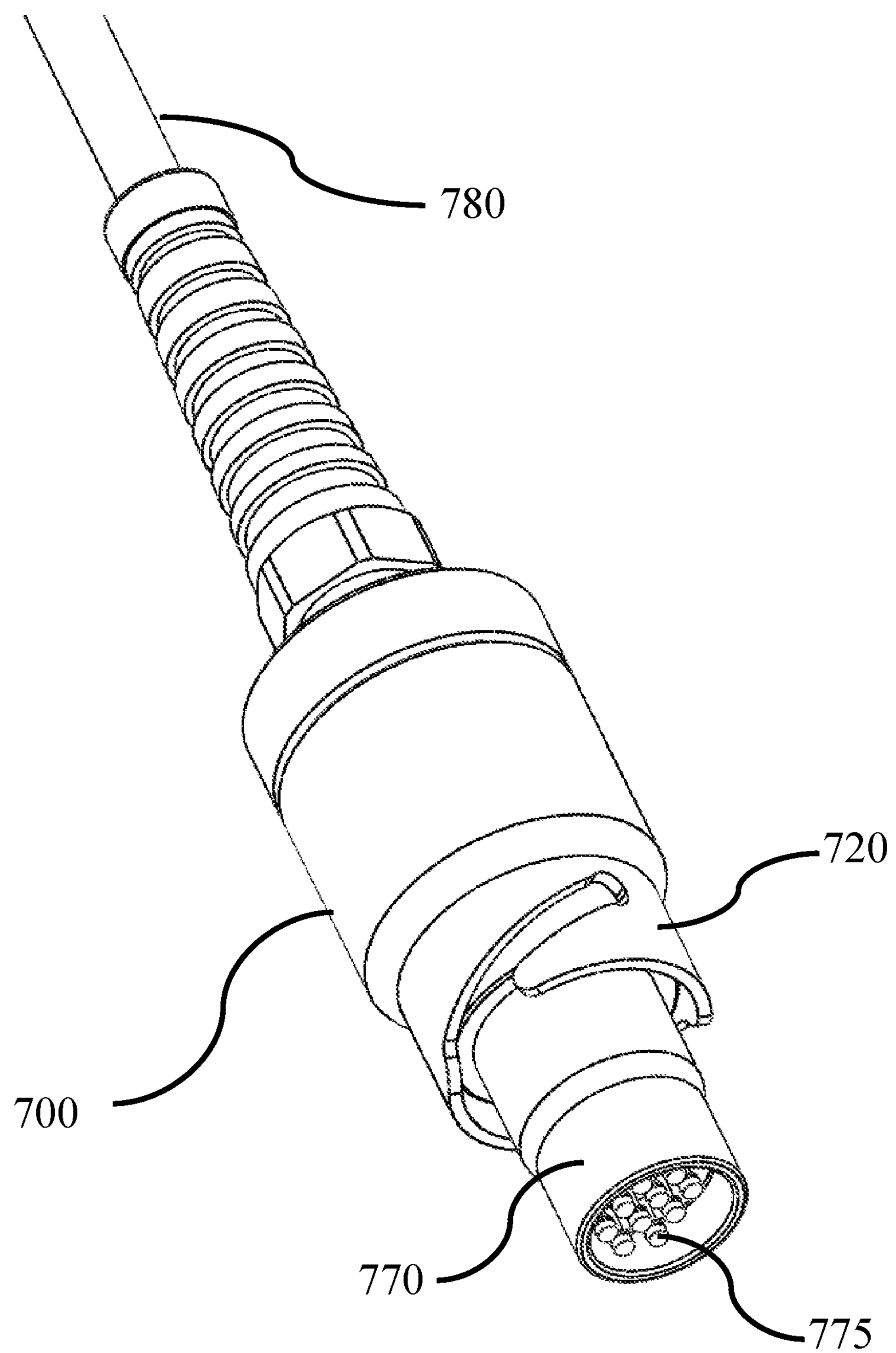
Figure 8A:
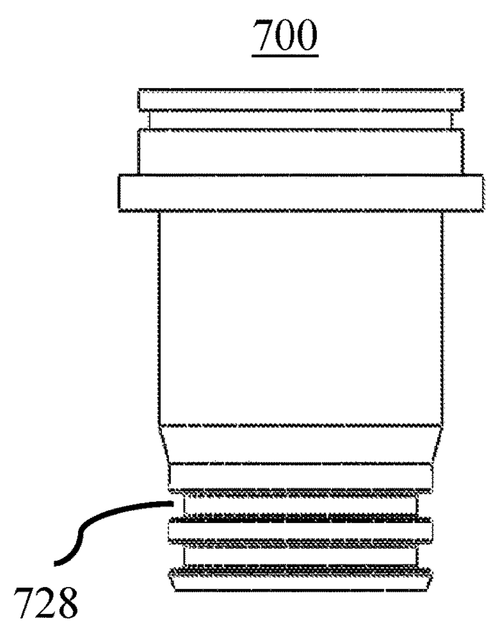
FIGS. 8A-B illustrate an embodiment of a bulkhead connector assembly and a plug assembly in exploded view.
Figure 8A:
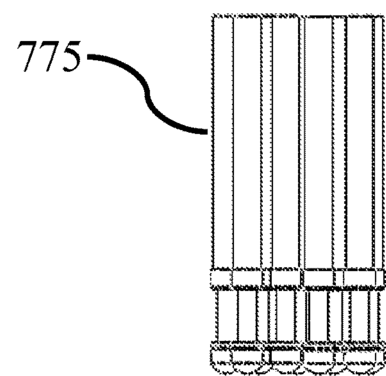
Figure 8A:
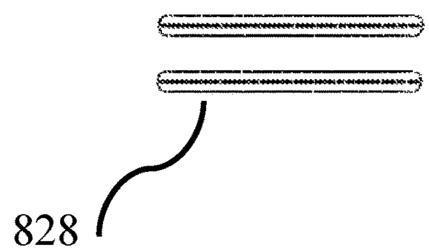
Figure 8B:
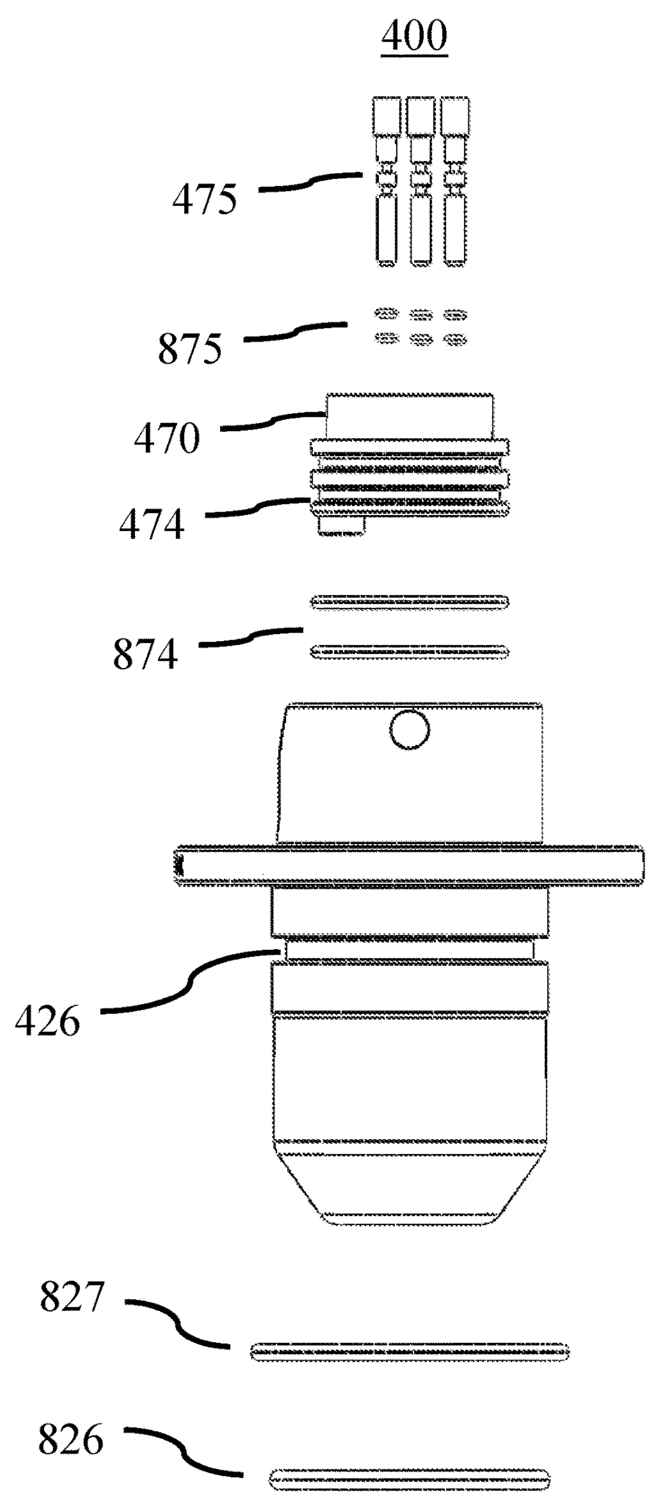

FIG. 7A illustrates a detailed view of one embodiment of bulkhead connector assembly 400 coupled to plug assembly 700. Plug assembly 700 may be used when power and/or data is transferred to or from the node. In normal situations, such a transfer occurs on the deck of a marine vessel, but other data transfer locations are possible. In one embodiment, plug assembly 700 couples to bulkhead connector assembly 400 in a similar configuration as pressure cap assembly 500. Plug assembly 700 is configured to mate with and/or be placed within a cavity of bulkhead connector assembly 400. Plug assembly 700 may have one or more concentric grooves 728 configured to receive sealing elements (e.g., O-rings), similar to grooves 528 on pressure cap assembly 500. Such sealing elements are easily replaced. Plug assembly 700 may have an enlarged lip or shoulder such that one side of shoulder mates against an end of bulkhead connector assembly 400 and another side of the shoulder mates against a lip or shoulder of plug body 730. Retaining cap 740 is configured to retain locking ring 720 to plug assembly 700 against tension springs 727. Thus, tension springs 727 may be configured to provide tension against locking ring 720 when connecting plug assembly 700 to bulkhead connector assembly 400. Plug assembly 700 may be coupled to bulkhead connector assembly 400 via locking ring 720, which may be similar to locking ring 520 that couples the pressure cap assembly to the bulkhead connector assembly. Thus, in one embodiment, locking ring 720 and bulkhead connector assembly 400 are configured such that locking ring 720 may be secured to bulkhead assembly 400 in a quick and efficient manner by substantially twisting the ring with little to no pushing, such as by a 90 degree turn or quarter (¼) turn of the locking ring. Plug assembly 700 may comprise a connector insert 770 that contains and/or is coupled to a plurality of plug connector pins 775. Plug connector pins 775 may be connected to an external device that is configured to transfer data and/or power to and from the node. One end of each plug connector pin 775 may be coupled to a wire, wherein all of the connected wires of the plurality of connector pins 775 may be found with cable 780 that is connected to an external device (not shown), such as a computer, data transfer device, or other external device. In one embodiment, connector insert 770 is configured to couple and/or mate with connector insert 470 of bulkhead connector assembly 400. In one embodiment, plug connector insert 770 has a substantially flat contact surface 771 on an external end of the connector that is configured to be adjacent to or flush with flat contact surface 471 when the plug assembly 700 is in locked mating position with bulkhead assembly 400. In other embodiments, the plurality of plug connector pins 775 are configured to couple to the plurality of bulkhead connector pins 475 for the exchange of data and/or power. FIG. 7B illustrates one perspective view of one embodiment of plug assembly 700.

As shown in FIG. 7A, in one embodiment, when plug assembly 700 is coupled to bulkhead assembly 400, the plurality of plug connector pins 775 is coupled to the plurality of bulkhead connector pins 475 such that data and/or power is transferred to and/or from pins 475 and 775. In one embodiment, one or more of the plurality of pins 775 touch and/or is coupled to one or more of the plurality of pins 475. In one embodiment, bulkhead assembly 400 and plug assembly 700 are configured such that when the two assemblies mate via a twisting or rotational motion, the resulting friction and/or contact between the two devices removes any surface corrosion or debris on the surfaces of the plurality of pins 475, 775 thereby enhancing the resulting electrical connection. In one embodiment, the number of plurality of pins 475 may be the same or different as the number of plurality of pins 775. In one embodiment, the plurality of plug connector pins 775 has a plurality of power connectors (such as a positive pin and a negative pin) and the plurality of bulkhead connector pins 475 has a plurality of power connectors (such as a positive pin and a negative pin), such that each of the power pins of the plurality of plug connector pins 775 is coupled to a respective power pin or connector of the plurality of bulkhead connector pins 475. Likewise, the plurality of plug connector pins 775 may have a plurality of data pins, connectors, or electrodes and the plurality of bulkhead connector pins 475 may have a plurality of data pins, connectors, or electrodes, such that each of the data pins of plurality of plug connector pins 775 is coupled to a respective data pin from the plurality of bulkhead connector pins 475. The plurality of pins 775 within connector insert 770 may comprise a plurality of metallic pins and a plurality of glass pins that are configured for data and/or power transfer to the node using a mix of electrical circuits and fiber optic signals. One or more of the plurality of pins 775 may be directly or indirectly connected or coupled to one or more of the node's power supply, data recorder, and electronic circuits via wires or optic fibers (not shown), as is well known in the art. In other words, to have a proper connection for data transfer and/or power transfer, both the plug connector insert and the bulkhead connector insert should have matching, equivalent, and/or corresponding connector interfaces for each of the pins, electrodes, optic fiber interfaces, and flat contact/circuit surfaces.

Referring to FIGS. 6 and 7A, in one embodiment, the coupling of a plurality of plug connector pins 775 and plurality of bulkhead connector pins 475 forms a flat circuit, which is different that a conventional plug which includes male pins and female receptacles. In a flat circuit, the contact points for the electrical connection are all substantially flat and/or located on a flat surface (such as surfaces 471, 771) such that the surface is flat and is a suitable landing area for the plurality of contact pins. A flat circuit provides many benefits, such as being easier to make a circuit connection, easier to clean, and more tolerant to alignment issues. In one embodiment, the flat circuit is comprised of a first plurality of pins (such as pins 475) and a second plurality of pins, with each of the pins having a substantially flat surface (such as surface 472) such that each surface of the plurality of first pins touches a surface of a corresponding pin from the plurality of second pins (such as pins 775). In this arrangement, the pin surfaces are large enough to make the circuit wider for tolerance and alignment issues. In some embodiments, the pin surface is substantially the same size as the shaft diameter of the pin, and in other embodiments the pin surface may be greater or substantially larger than a shaft diameter of the pin. If one of the connector portions (such as plug assembly 700 and/or bulkhead assembly 400) is or becomes misaligned or shifted in position, each of the pin connections may remain substantially touching to keep the circuit intact. Thus, even if a portion of one or more of the corresponding pins is in electrical contact, the flat circuit may remain intact. In other words, the flat circuit allows an increased amount of movement and misalignment of the pins and/or electrical connectors while maintaining the data and electrical connection. This is important as each of the plurality of pins may experience a certain amount of movement during the connection. Further, the flat circuit is composed of inert materials such that when it may be exposed to salt water in subsea conditions, the electrical connection is not damaged. In one embodiment, each of the plurality of metallic plug connector pins 775 may have a contact surface that is configured to be mate with a corresponding bulkhead connector pin 475. In some embodiments, plug connector pins 775 may be substantially flush with flat contact surface 771, whereas in other embodiments each plug connector pin 775 may be coupled to a spring or other retracting mechanism (see, e.g., FIG. 11) that allows the pin to protrude from the flat contact surface 771 for better contact and mating with a corresponding pin 475. The heads of each contact pin 775 may be spherical, flat, or other shapes, and may be larger or smaller than the remainder of the pin body and may be larger or smaller than the corresponding contact surface 472 of pin 475.

In one embodiment, by rotating the plug body into the bulkhead connector assembly, connector insert 770 (with the electrical connections) is drawn into the bulkhead connector cavity, thereby rotating all of the plurality of electrical pins 775 against the opposing flat insert surface 471 until the pins align into their correct flat circuit. The motion of the rotation and alignment of the pins against the surface of the flat contact surfaces/circuits allows a connection to be made as well as self-cleaning of the contact surfaces by the gentle friction between the parts. In one embodiment, by changing the spiral angle of slot 522 (see FIGS. 5C/5D) from a shallow angle to vertical or near vertical, the rotation travel arc of the pins against the flat contact surfaces may be changed. With the custom design of the rotation angle, various contact travel paths for the pins against the insert and location of the flat contact surfaces/circuits can be designed to optimize the connection and prevent accidental shorting of electrical circuit pathways while maintaining the desired circuit connections. Further, in one embodiment the spiral angle of slot 522 is related to the rotation travel and force to pull the connector into the bulkhead assembly. Thus, the spiral angle may be changed to decrease the force (which increases the amount of required rotation) required to insert a plug/pressure cap/external device into the bulkhead assembly connector and vice versa, depending on the particular connection techniques In one embodiment, locking ring 720 may be configured to rotate around the plug assembly (or pressure cap assembly) as it is coupled to the bulkhead connector assembly. The examples described above generally describe a locking ring that is free to rotate around the plug with an inner core keyed to a fixed position around the plug. In other embodiments the locking ring may be fixed to the plug assembly or pressure cap assembly such that rotation of ring 720 causes the entire plug or pressure cap assembly to rotate. Thus, a fixed bayonet-locking ring that is part of a plug assembly (or a pressure cap assembly) need not have a guiding key that interfaces with notch 450, but instead may have a slot similar to slot 522 that may engage pin 455 that functions as a locating key without notch 450.

In other embodiments, rather than using electrical pins to achieve a direct electrical connection within the node plug connector, a quick connect coupling may utilize wireless technologies within the plug, such as those described in U.S. Patent Publication No. 2016/0094298, which is incorporated herein by reference. For example, electrical data and/or power may be transferred optically within the plug assembly over one or more fiber optic connections to form a free-space wireless communications beam. In this wireless embodiment, a pressure cap assembly and plug assembly may be coupled to the bulkhead connector assembly in a similar fashion as to the wired pin assembly (e.g., this alternative embodiment may still utilize the disclosed quick connect mechanism, sealing elements, etc.). In one embodiment, the bulkhead connector assembly comprises a first plurality of fiber optic connections that are configured to couple with a second plurality of fiber optic connections on the plug assembly. Other types of connections are possible besides a plurality of pins or fiber optic connections, such as coaxial type configurations with or without springs. Still further, in an alternative embodiment, the node is configured for electromagnetic wireless transfer using Wi-Fi or inductive or capacitive coupling.

FIG. 8 illustrates an embodiment of bulkhead connector assembly 400 and plug assembly 700 (which may be substantially similar to the components described in relation to FIG. 7A) with some of the primary components illustrated in exploded view to illustrate how the components may be assembled and the sealing elements. Plug assembly 700 comprises a plurality of plug connector pins 775, each of which may have a separate wire connection (not shown) connected to one or more circuits coupled to a device separate from the node (such as a computer or power supply). Sealing element (e.g., O-ring) 828 is configured to be placed in circumferential groove 728. Similarly, bulkhead connector assembly 400 comprises a plurality of connector pins 475, each of which may have a separate wire connection (not shown) connected to one or more circuits coupled to the node power supply and/or electrical components. Each of the plurality of connector pins 475 may have one or more sealing elements 875. Sealing element 874 is configured to be placed in circumferential groove 474 on bulkhead connector insert 470. In some embodiments, a plurality of sealing elements 874 may be used. Sealing element 826 is configured to be placed in circumferential groove 426 on the exterior radial surface of bulkhead connector assembly 400 and sealing element 827 is configured to be placed in circumferential groove 427 (see FIG. 4A) on a flange of bulkhead connector assembly 400. Other sealing elements and/or systems and positions thereof may be used as appropriate.

Figure 9:
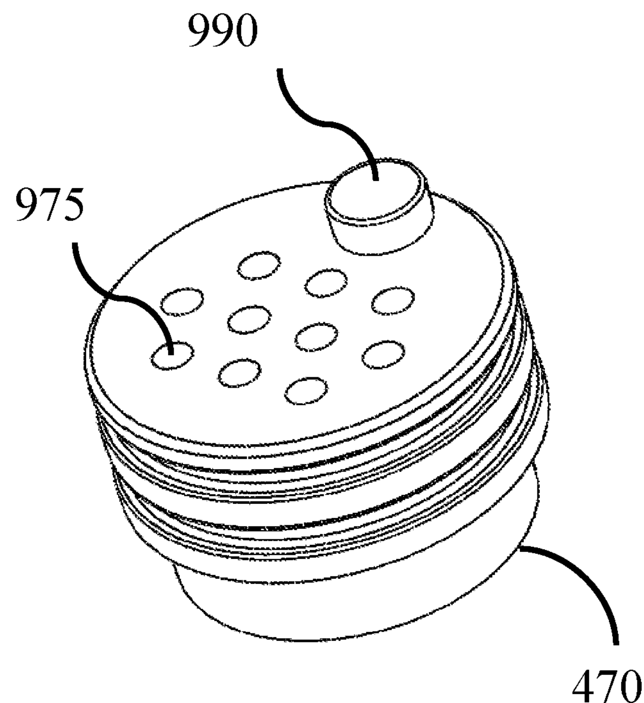
FIG. 9 illustrates an embodiment of a connector insert on a bulkhead connector assembly.

FIG. 9 illustrates one embodiment of connector insert 470 of bulkhead connection assembly 400. In one embodiment, as shown in FIG. 9, connector insert 470 may be configured to receive a plurality of pins 475 (such as 10) in a plurality of recesses or holes 975. In other embodiments, connector insert 470 may be configured with protrusion 990 that acts as a guide or positioning device to mate with a plug assembly and/or a pressure cap assembly. As is obvious to one of skill in the art, a corresponding recess to protrusion 990 would be found on the mating portion of the pressure cap assembly and/or plug assembly (not shown).

Figure 10:
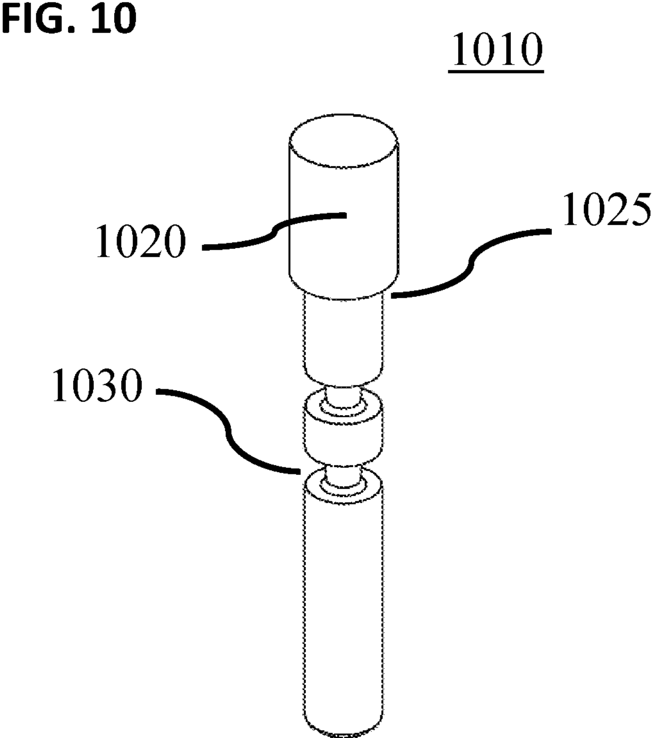
FIG. 10 illustrates an embodiment of a connector pin.

FIG. 10 illustrates one embodiment of connector pin 1010, which may be substantially similar to one of the plurality of bulkhead connector pins 475. As shown, connector pin 1010 may be substantially cylindrical and contain one or more circumferential grooves 1030 configured to receive a sealing element (such as O-ring 875). The head or upper portion 1020 of connector pin 1010 may be enlarged such that it creates shoulder 1025 that sits within corresponding hole or recess 975 of connector insert 470. The shoulder interaction between a pin and a shoulder of a corresponding receiving hole 975 of connector insert 470 helps keep the pin in position. While FIGS. 9 and 10 have been in reference to the bulkhead connection assembly, a similar arrangement and configuration of the pins and connection assembly may be found for plug assembly 700. FIG. 10 can also be representative of a glass or transparent media interface pin that can be used to transmit fiber optic data through to a fiber connection (not shown).

Figure 11:
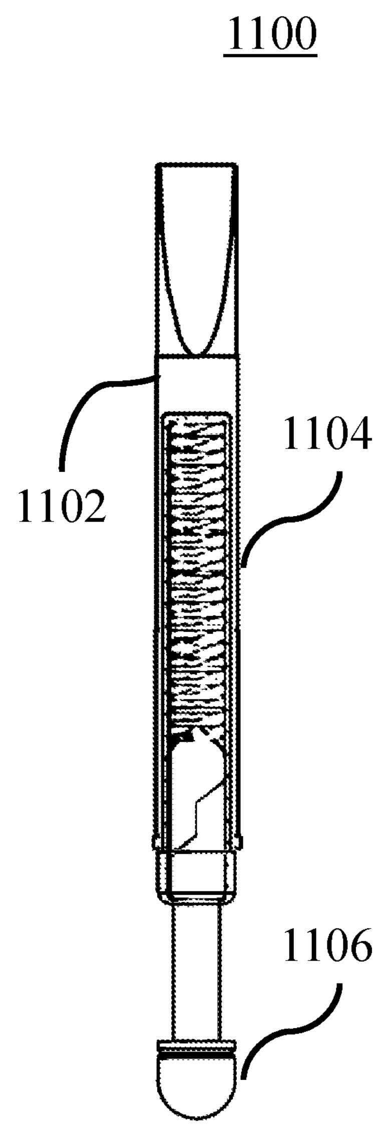
FIG. 11 illustrates an embodiment of a spring loaded pin assembly.

FIG. 11 illustrates one embodiment of spring loaded pin assembly 1100, which may be used for each of the plurality of pins 775 in plug connection assembly 700. In one embodiment, pin assembly 1100 comprises pin 1102 coupled to spring 1104. Pin 1102 may be inserted into a plug assembly (such as plug assembly 700) and a portion of the pin may be surrounded by spring 1104. In other embodiments, substantially all of pin 1102 is surrounded by spring 1104 or other retractable mechanism. In some embodiments, pin assembly 1100 has an enlarged head or surface 1106 that mates and/or couples with a corresponding pin (such as pin 475) on the other side of the electrical connection/circuit to form a substantially coaxial configuration in the connection. In some embodiments, pin head and/or surface 1106 may be flat, while in other embodiments the head and/or surface may be rounded, such as in the shape of a hemisphere, as shown in FIG. 11. Pin 1102 may have a shoulder that prevents the pin from springing out and/or fully exiting the plug assembly. Spring loaded pin assembly 1100 is configured to retract the pin at least partially in and out of plug assembly 700 for better contact between the retractable spring to a corresponding electrical connection on the bulkhead connector assembly 400, such as a corresponding pin from plurality of pins 475. In other embodiments, a plurality of spring assemblies 1100 may be used any external connecting device that is configured to mate with bulkhead connector 400.

In one embodiment, an electrical circuit is formed between the plug connection assembly 700 and the bulkhead connection assembly 400 that comprises a first plurality of pins (such as pins 775) coupled to a second plurality of electrical connections (such as pins 475). The second plurality of electrical connections may or may not be a plurality of pins. In one embodiment, at least one of the first plurality of pins is a spring assisted pin (such as pin assembly 1100), and in other embodiments, at least two or even all of the first plurality of pins are retractable pins. Each of the retractable pins may be arranged to interface and/or couple with a surface that is not retractable, such as a flat pin surface (such as contact surface 472). In this arrangement, a flat circuit may be formed such that one side of the circuit comprises a substantially non-moving surface (such as substantially flat surface 471) and the other side of the circuit may comprise one or more retractable surfaces that engages electrical connectors (such as electrical contact surfaces 472) on the non-moving surface. Retractable pin assembly 1100 provides an enhanced connection, as it lessens the effects of misalignment and tolerance issues and allows each of the plurality of connections in the circuit to be individually altered to make a more secure connection. In other embodiments, rather than using a plurality of pins with a plurality of springs, the flat circuit connection may be established by a coaxial type connection such that the inner connector has a spring and the outer circular housing has a separate spring.

Figure 12:
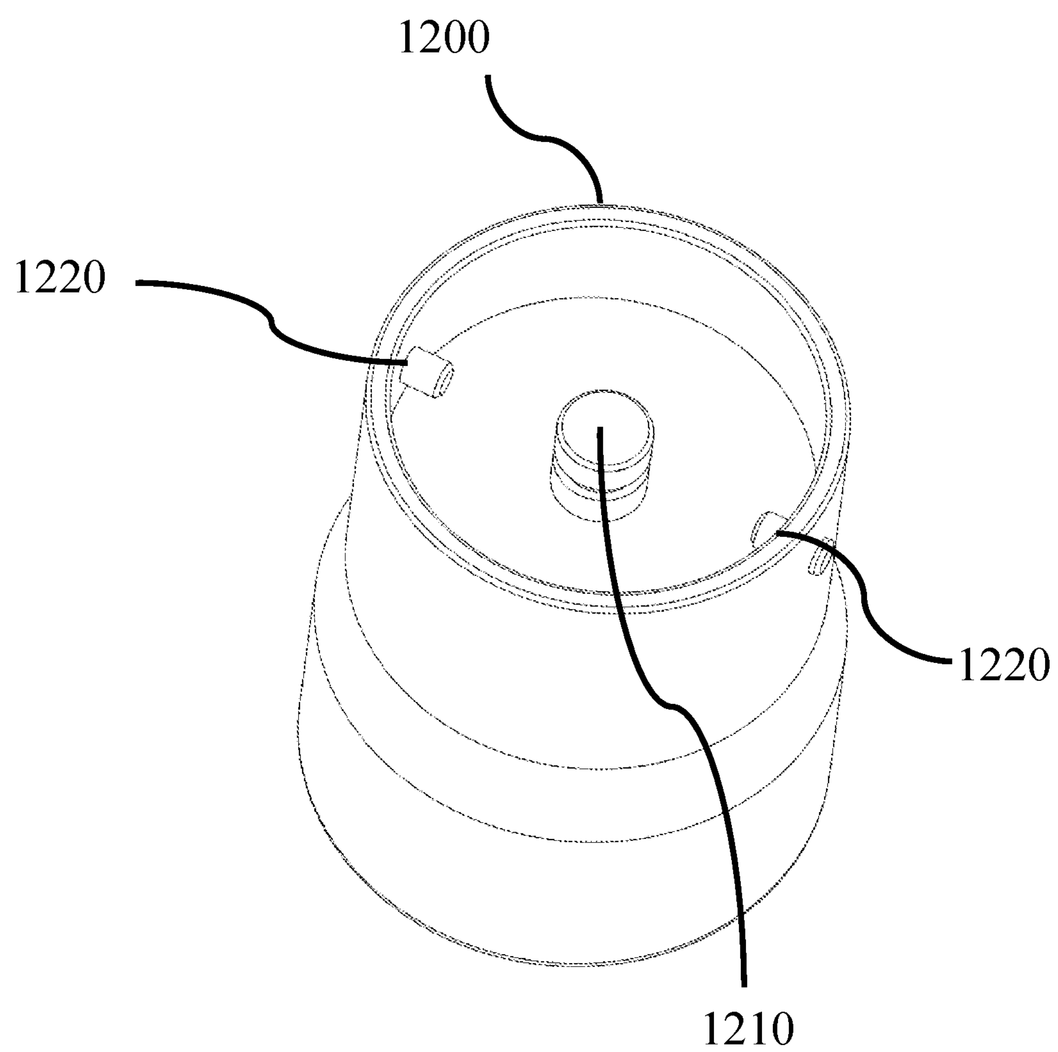
FIG. 12 illustrates an embodiment of a pressure cap removal tool.

FIG. 12 illustrates one embodiment of pressure cap removal tool 1200. This tool may be needed in some situations where the pressure cap assembly (such as pressure cap assembly 500) is deeply recessed into a node or bulkhead connection assembly that limits access by a human operator. Tool 1200 can also be part of an automated robot assembly that can install or remove a pressure cap automatically. In one embodiment, tool 1200 has a body that is substantially cylindrical. A first end of the tool may be configured to be grabbed by an operator and the second end of the tool may be configured to couple with the pressure cap assembly. The second end of tool 1200 may comprise a cavity with protrusion 1210 substantially in the middle of the cavity. The cavity may be placed over a portion of the pressure cap assembly. Protrusion 1210 is a tool alignment mechanism and is configured to couple with and/or mate to a hole or recess on the pressure cap assembly (such as hole 536). The second end of tool 1200 may also comprise one or more protrusions 1220 on an inner surface of tool 1200, each of which is configured to couple with and/or mate to a hole or recess on the pressure cap assembly (such as T slots 534) to turn the pressure cap assembly. In other words, tool 1200 is configured to lock to pressure cap assembly 500 and turn the pressure cap assembly to facilitate removal and attachment of pressure cap assembly 400 to bulkhead connection assembly 500. Of course, one of ordinary skill in the art will realize that such a tool is not necessary for such attachment and release, which may be done manually by a human operator or automatically by a robot.

Figure 13A:
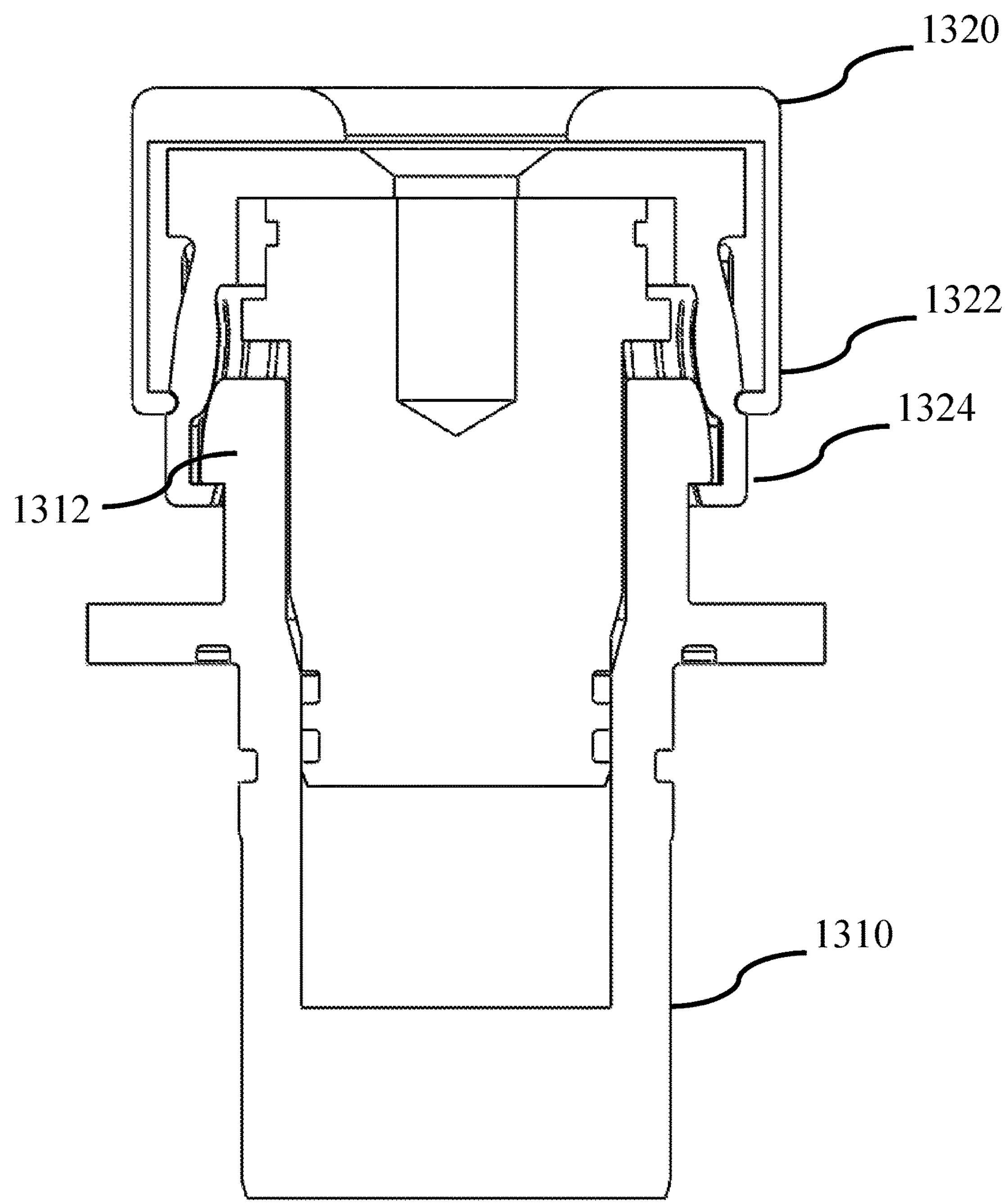
FIGS. 13A-C illustrate an alternative embodiment of a quick connection and release mechanism in the form of a push/pull assembly.
Figure 13B:
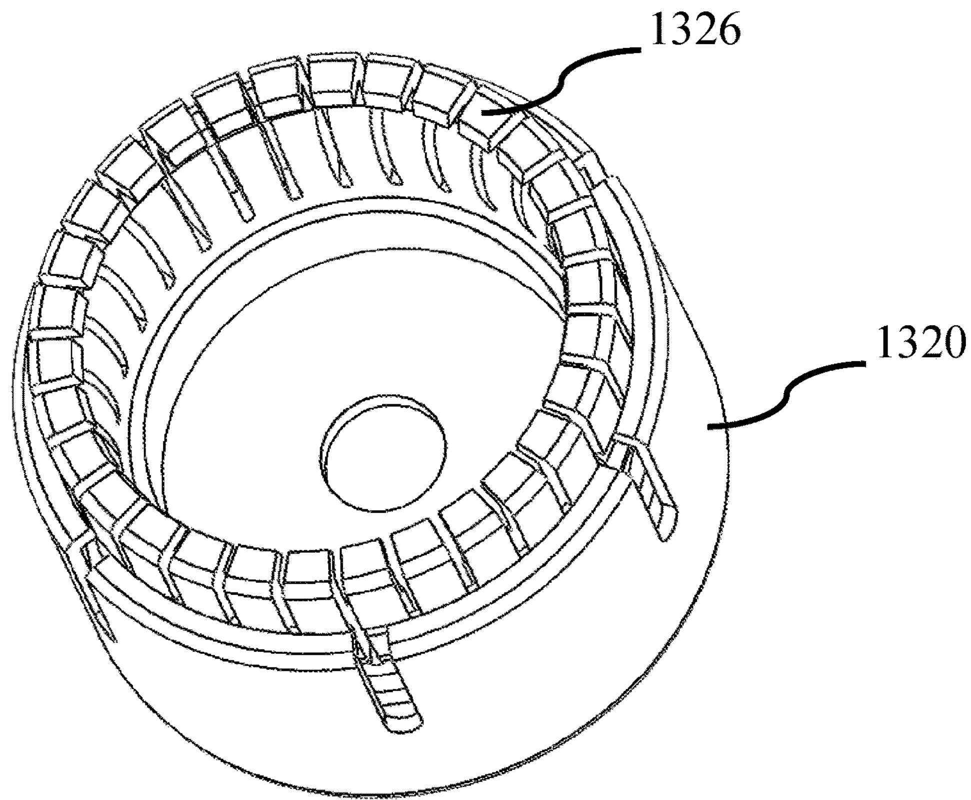
Figure 13C:
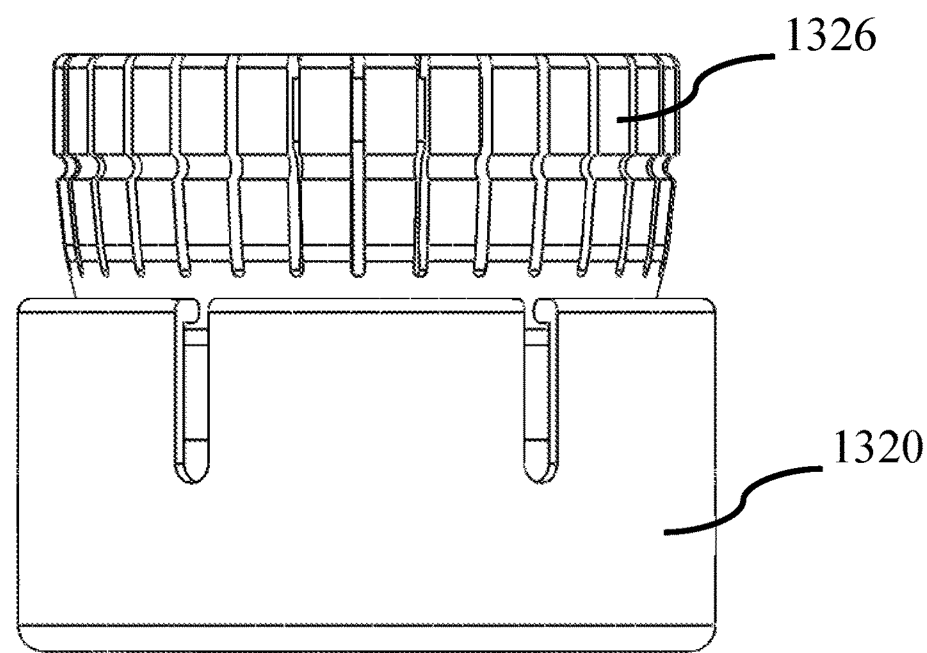

FIGS. 13A-13C illustrate another embodiment of a connection assembly that utilizes a quick connect disconnect cap that is push on/pull off as opposed to a quarter twist connection as disclosed in the prior embodiments. FIG. 13A illustrates a cross-sectional side view of push on/pull off connector assembly 1320 coupled to a bulkhead connection assembly, while FIGS. 13B and 13C illustrate perspective and side views of the push on/pull off connector assembly, respectively. The push on/pull off connector assembly can be utilized for a pressure cap or plug connection assembly or any other external mating device to the bulkhead assembly. Bulkhead connector assembly 1310 may be substantially similar to bulkhead connector assembly 400, with similar sizes, configurations, and components. Quick connect assembly 1320 may comprise one or more locking rings 1322, 1324 that effectively clip on one or more shoulders 1312 of bulkhead housing 1310. In one embodiment, each locking ring 1322, 1324 is bendable such that it can lock and unlock from a shoulder or groove. Quick connect assembly

1320 may be coupled to or integrated with a pressure cap assembly (similar to cap assembly 500) and/or plug connection assembly (similar to plug connection assembly 700). To attach quick connect assembly 1320 to the bulkhead housing, it can simply be pushed with force onto the bulkhead housing, such that the locking rings 1322, 1324 engage or clip over a shoulder on the bulkhead housing. To remove quick connect assembly 1320 from bulkhead housing 1310, quick connect assembly 1320 can simply be removed by pulling assembly 1320, which releases locking ring 1322 from retaining clips 1324 which are then free to spring away from shoulders 1312, thereby releasing the cap. In one embodiment, as shown in FIGS. 13B and 13C, one or more of locking rings 1322, 1324 may comprise a plurality of locking sections 1326 distributed around a circumference of the locking ring, each of which may be configured to lock around a ledge or shoulder 1312 of the bulkhead connector housing 1310.

As described above, the disclosed flat contact surface and quick release bulkhead connector assembly 400 provides numerous advantages over conventional bulkhead connectors. One of these advantages is its easy ability to mate with a wide range of external devices during subsea operations, which greatly increases the overall functionality of the node and allows it to be paired essentially to any external electronic device. In other words, the configuration of bulkhead connector assembly 400 (and the internal electronic components and flat circuit of the bulkhead assembly) does not have to necessarily change based on the particular external device being connected to the bulkhead assembly 400. Similarly, each connectable external device may have a similar quick connection mechanism (such as locking ring 520) that may be utilized to attach the external device to the bulkhead assembly in a similar fashion as pressure cap assembly 500 or plug connection assembly 700. As an example, prior to deployment subsea, an external device (such as a transponder) may be quickly and easily inserted into the bulkhead connector assembly on the node. In other embodiments, an ROV may be used to couple an external device to the bulkhead connection housing while the node is already subsea, such as on the bottom of the seabed. In some embodiments, a plurality of and/or a variety of external devices may be coupled to the node depending on the particular survey requirements.

Protective pressure caps can also be made multipurpose to not only provide a primary pressure seal or water barrier but also provide other functionality. For example, the pressure cap can be made to house embedded electronics, cables and/or external devices connecting through the bulkhead connector to electrical or optical hardware or circuitry inside the node permanently connected or available prior during deployment. Similarly, protective caps (even if not pressure/water resistant) that couple to one or more electronic devices may be utilized during non-subsea operations, such as during operations on the back deck of a marine vessel. For example, a Wi-Fi transmitter/receive may be coupled to the node after the node is retrieved on the vessel, which allows the node to transmit wirelessly to other devices or systems while on board the vessel.

In still other embodiments, the connections pins on the bulkhead connector (such as plurality of pins 475) may also be provided with a loopback or shorting plug. Such a loopback system may be configured to identify that an external device is connected and the type and/or identification of the device based on the particular configuration of pins that are looped back. In other words, the connection pins are configured for various electrical circuit "keys" and the node electronics system is configured to intelligently accommodate the external device by using a node microprocessor to control various switches to route signal paths to corresponding circuitry. This can be used to modify the electronics inside the node to perform the desired functionality of the external device. For example, if the node decoder has 4 pins (0, 1, 2, 3), and the external device is configured to short pins 0 and 1, the node electronics system may be configured to treat and/or recognize the external device as a hydrophone (as one example). Similarly, if pin 0 is shorted to pin 2 then the system may recognize the external device as being a pressure sensor. Other arrangements are of course possible to one of ordinary skill in the art. This external device identification can also be achieved electronically by the external device by direct communications between the external device and the node processor. For example, when the external device is powered up it may directly communicate with the node electronics system (e.g., a node processor) to configure the electronics system correctly for the specific external device.

Figure 14:
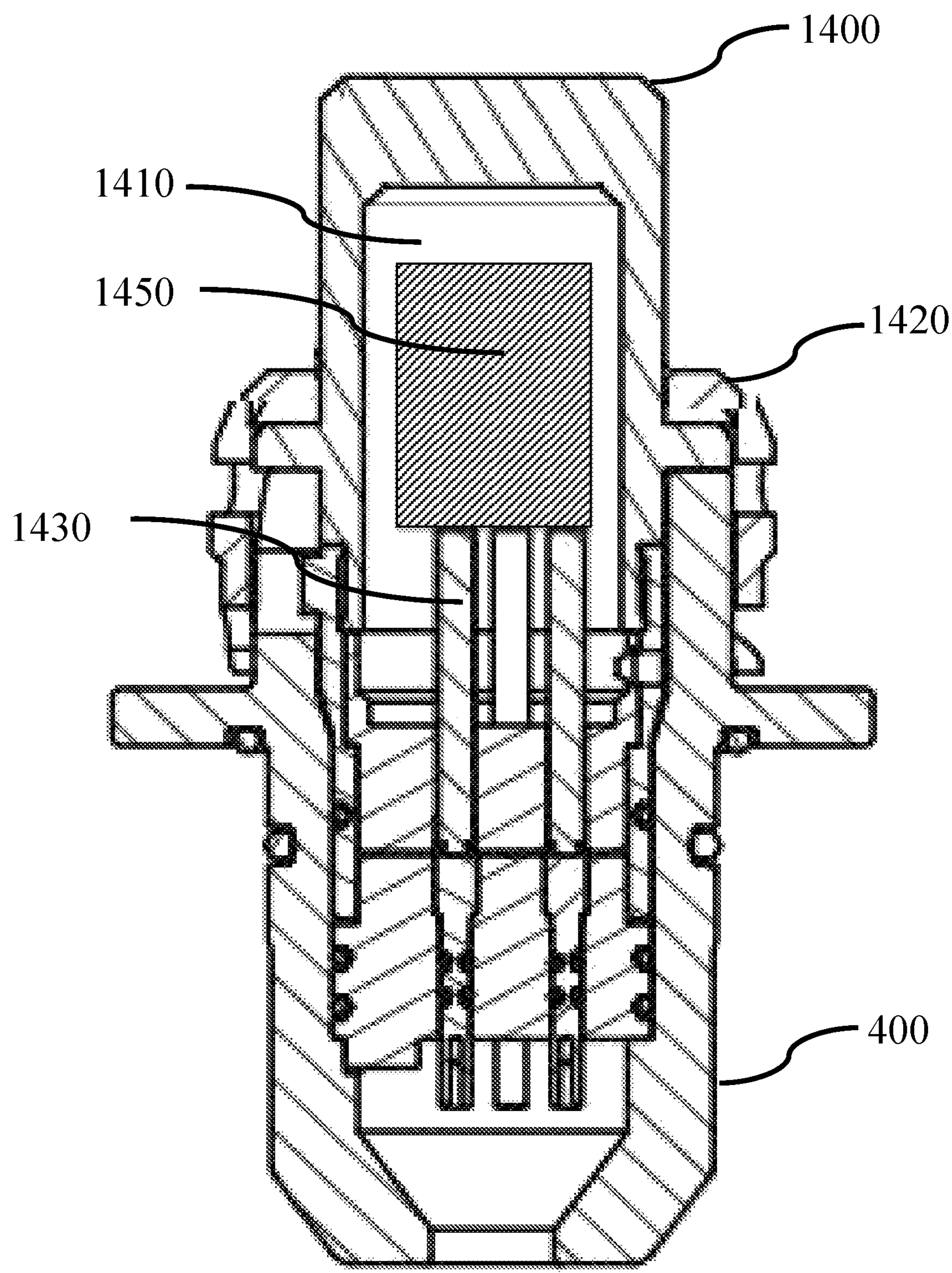
FIG. 14 illustrates an alternative embodiment of an external device located in a pressure cap assembly that may be coupled to a bulkhead connection assembly.

FIG. 14 illustrates an embodiment of an external device that may be coupled to bulkhead connector assembly 400 via pressure cap assembly 1400. Pressure cap assembly may be fastened to bulkhead housing 400 by locking ring 1420, which may be substantially similar to locking ring 520. Pressure cap assembly 1400 may include a plurality of pins or interface connections 1430 that allow electrical and/or optical connection between an electronic device 1450 located in pressure cap assembly 1400 and the internal components of the node (not shown). In one embodiment, pressure cap assembly 1400 may comprise cavity 1410, which is sized to house electronic device 1450. Such an electronic device may be coupled to the bulkhead connector of the node via electronic interface connections 1430. External device 1450 may be located within a pressure proof housing and/or a hermetically sealed housing itself, whereas in other embodiments the pressure cap itself is configured as a pressure resistant housing for the external device. External device 1450 can be a wide range of components, such as an external sensor including flux gate magnetometers, accelerometers, and electrical coils, a wireless communication system such as a Wi-Fi antenna or other inductive transfer systems, optical communication systems, acoustic modems, transmitters used for positioning and communication, or even LED indicators. In general, the external device located in the pressure cap assembly may be used during the node deployment on the seafloor to sense environmental signals, communicate with ROVs, AUVs, surface vessels, or other subsea or surface components. In addition, some of the components in the pressure cap can be used to communicate or provide status readings when on board the vessel.

Figure 15:
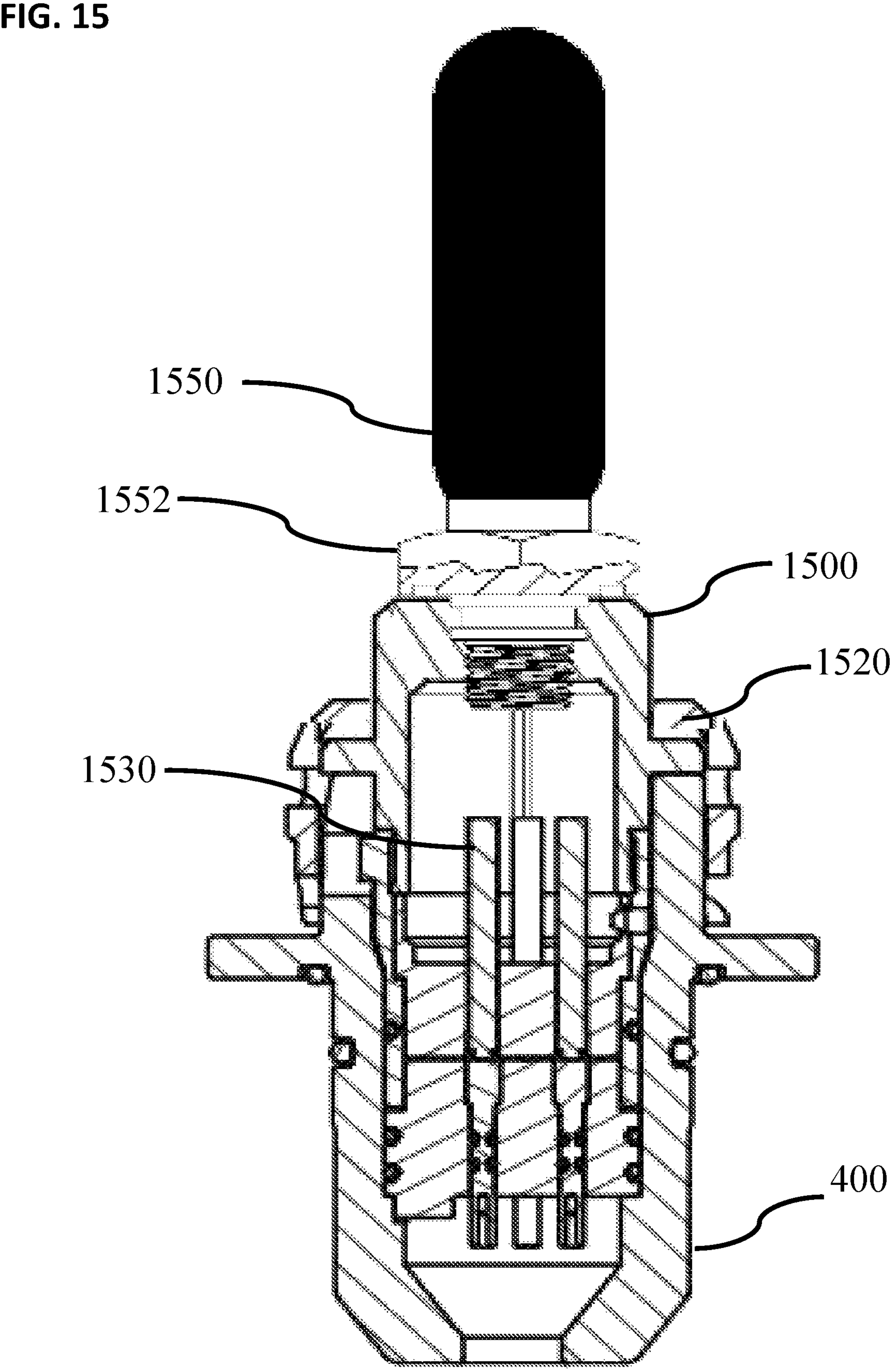
FIG. 15 illustrates an alternative embodiment of an external device coupled to and/or external to a pressure cap assembly that may be coupled to a bulkhead connection assembly.
Figure 16:
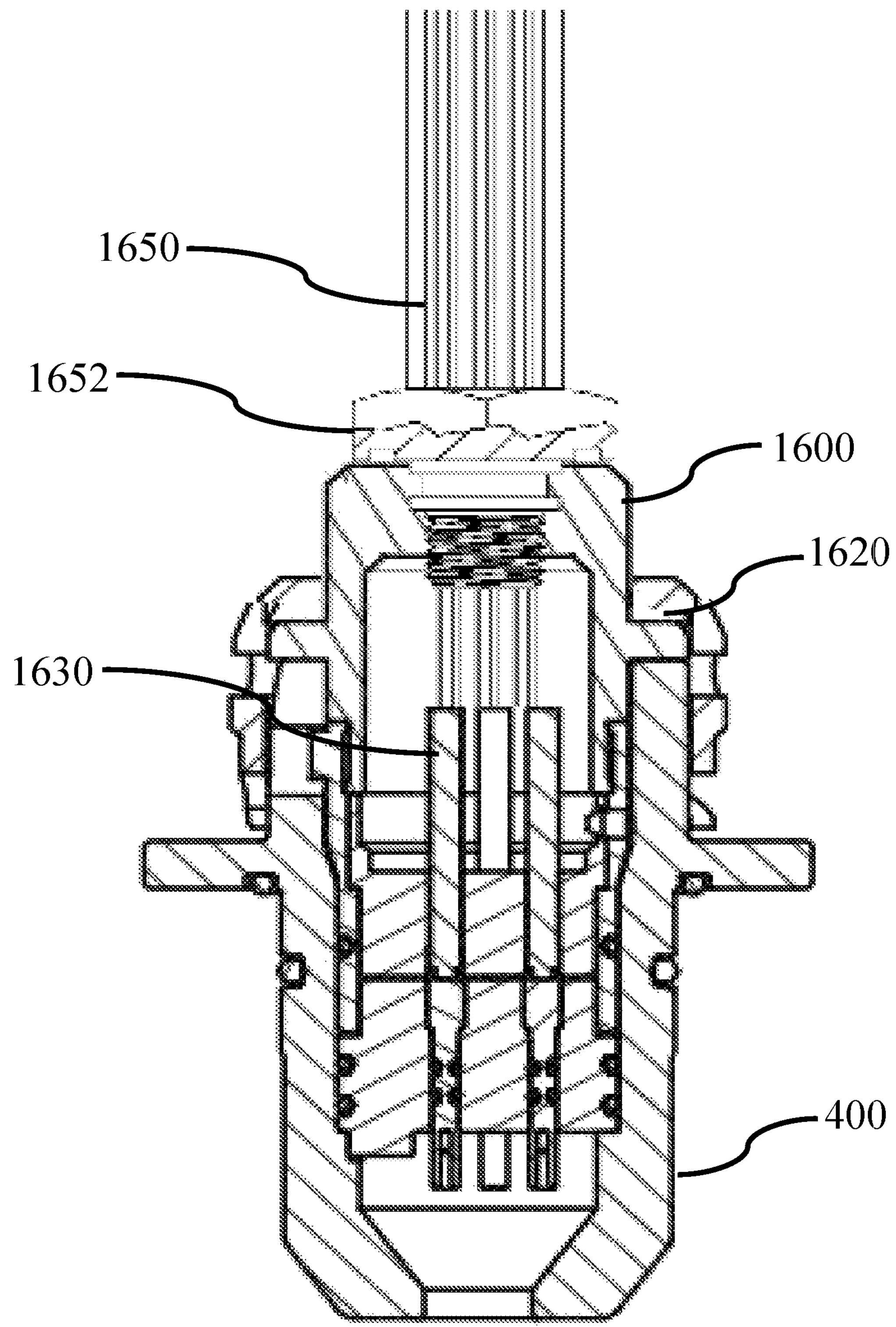
FIG. 16 illustrates an alternative embodiment of an external cable connected device remote from a pressure cap assembly that may be coupled to a bulkhead connection assembly.

In addition, passive or powered components can be coupled to the pressure cap or by connection to cables and components that have contact with the seawater for additional sensor purposes. Such external devices may included but not limited to a second hydrophone, pressure sensor, electrodes for detecting electric fields, salinity and velocity detectors, and chemical sensor detectors that can be used to sniff for hydrocarbons or detect chemical properties of the soil. FIGS. 15 and 16 illustrates such embodiments.

FIG. 15 illustrates an alternative embodiment of an external device that may be coupled to bulkhead connector assembly 400 via pressure cap assembly 1500, but be exposed to water and/or be located on the outside of pressure cap assembly 1500. Pressure cap assembly 1500 may be fastened to bulkhead housing 400 by locking ring 1520, which may be substantially similar to locking ring 520.

Pressure cap assembly 1500 may include a plurality of pins or interface connections 1530 that allow electrical and/or optical connection between an electronic device 1550 coupled to pressure cap assembly 1500 and the internal components of the node (not shown). As mentioned previously, device 1550 may be an active or passive powered component, and in one embodiment may be a passive hydrophone that is exposed to water. The connection of hydrophone 1550 to pressure cap assembly 1500 may be made by pressure proof components and cables with designs known to those skilled in the art of underwater cables and components. For example, as is known in the art, connection 1552 between pressure cap assembly 1500 and external device 1550 may be a simple waterproof connection that is resistant to high pressures.

FIG. 16 illustrates an alternative embodiment of an external device that may be coupled to bulkhead connector assembly 400 via pressure cap assembly 1600, but be exposed to water and/or be located on the outside of and/or separate to pressure cap assembly 1600. FIG. 16 is similar to FIG. 15 but includes oil filled cable 1650 directly coupled to pressure cap assembly 1600 instead of the external device. In this embodiment, the external device (not shown) but may indirectly coupled to the pressure cap assembly 1600 (and node) by oil filled cable 1650 that is then connected to the external device or even another node or nodes some distance away from the node. This situation may be useful in a variety of conditions, such as where it is desired to place a sensor some distance away from the node or having linked active nodes forming a local network. As in other embodiments, pressure cap assembly 1600 may be fastened to bulkhead housing 400 by locking ring 1620, which may be substantially similar to locking ring 520. Pressure cap assembly 1600 may include a plurality of pins or interface connections 1630 that allow electrical and/or optical connection between the electronic connections within oil filled cable 1650. In one embodiment, as is known in the art, connection 1652 between pressure cap assembly 1600 and oil filled cable 1650 may be a simple waterproof connection that is resistant to high pressure.

Figure 17A:
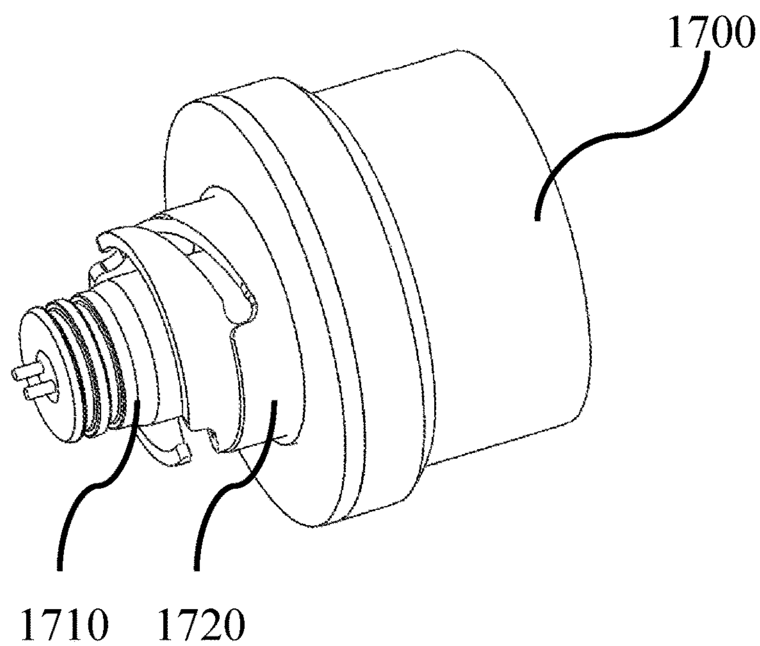
FIG. 17A illustrates an alternative embodiment of an external device that may be coupled to a bulkhead connection assembly, such as a large acoustic transducer.
Figure 17B:
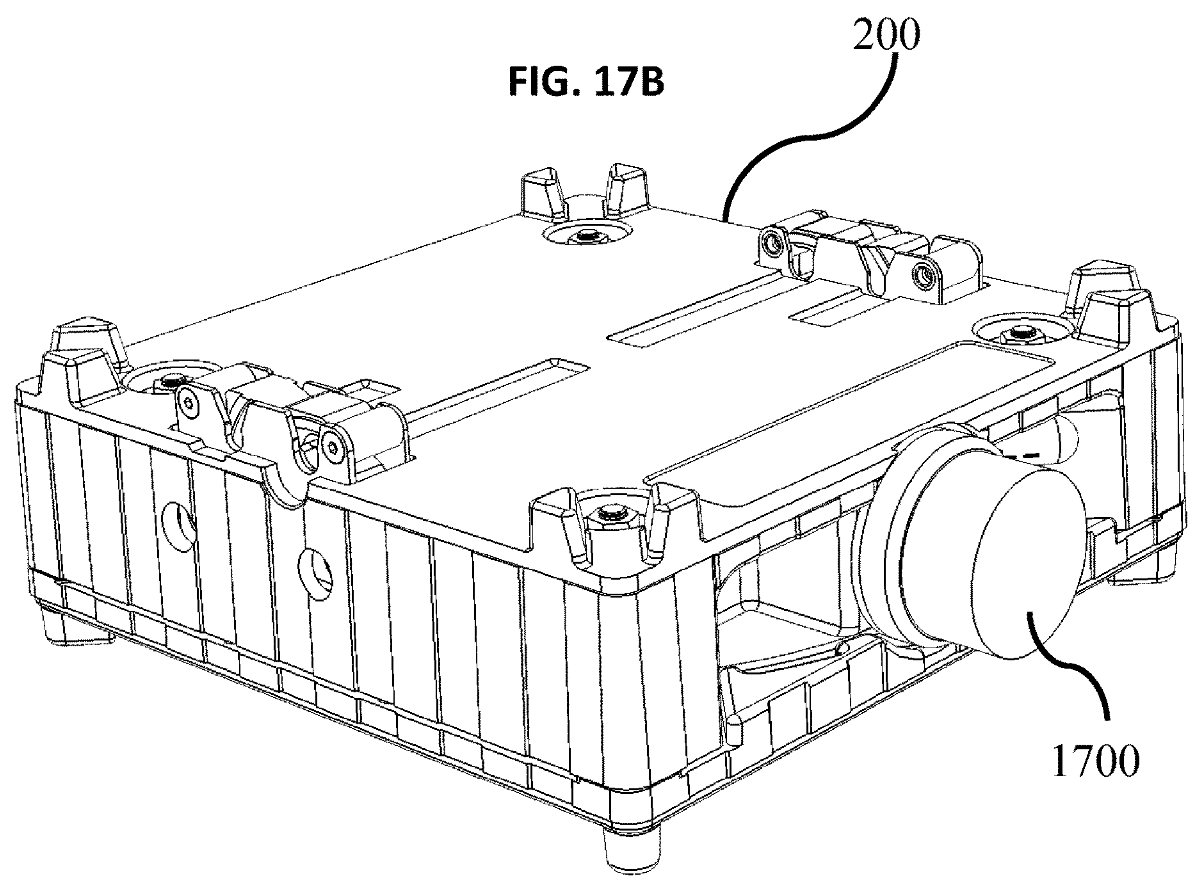
FIG. 17B illustrates the external device of FIG. 17A coupled to a seismic node
Figure 18A:
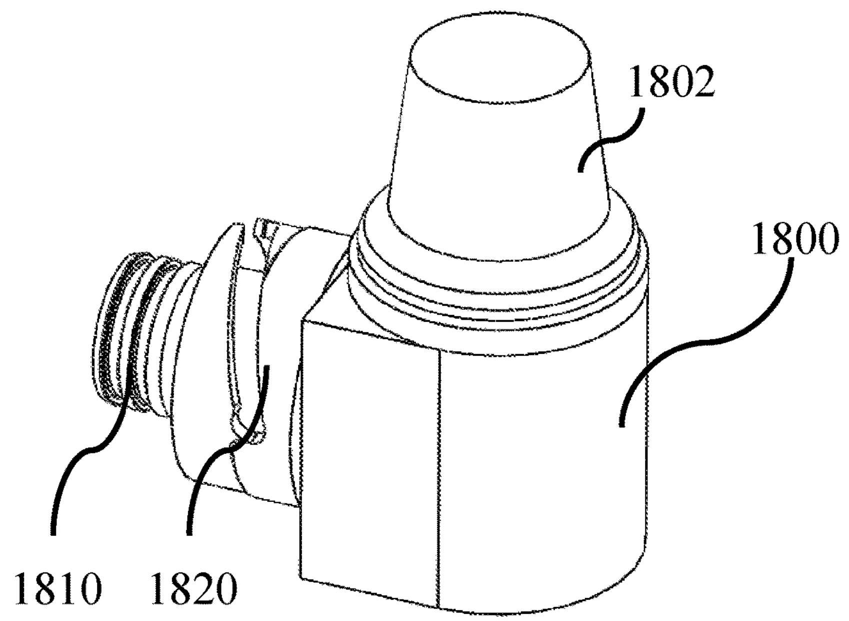
FIG. 18A illustrates an alternative embodiment of an external device that may be coupled to a bulkhead connection assembly, such as a small acoustic transducer.
Figure 19A:
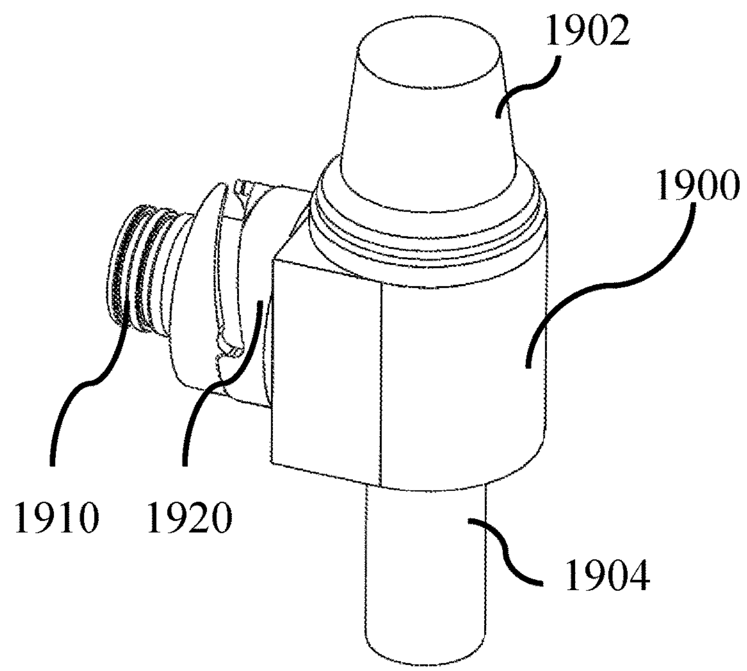
FIG. 19A illustrates an alternative embodiment of an external device that may be coupled to a bulkhead connection assembly, such as a small acoustic transducer and soil sensor.

Similar to the above alternative embodiments, FIGS. 17A, 18A, and 19A illustrate embodiments of alternative external devices that may be coupled to bulkhead connector assembly 400. For example, FIG. 17A illustrates an alternative embodiment of acoustic transducer 1700 that may be coupled to a bulkhead connection assembly. Transducer 1700 may be configured with locking ring 1720 and connector insert 1710 that is configured to electrically/optically mate with bulkhead connector assembly 400. In the disclosed embodiment, locking ring 1720 is integral to (e.g., fixed to) transducer 1700 in that the entire mechanism/external device rotates as the locking ring is rotated. Two spring-loaded metallic pins are shown protruding from connector insert 1710. Such pins are configured to retract into connector insert 1710 when they engage the flat surface of the corresponding mating surface of the bulkhead connector housing. In one embodiment, the bulkhead connector assembly 400 may be located on an autonomous seismic node, such as seismic node 200 similar to that disclosed in FIG. 2B. As shown in FIG. 17B, transducer 1700 may be configured to be substantially flush with an upper surface of the node. FIG. 17B illustrates the external device of FIG. 17A coupled to one embodiment of a seismic node. Large transducer 1700 is representative of a communication modem or acoustic positioning device used for long ranges. Such a device may be useful when the node is deployed by an ROV. Such a device may communicate with an ROV, AUV, other nodes, other subsea devices, and other marine surface vessels.

Figure 18B:
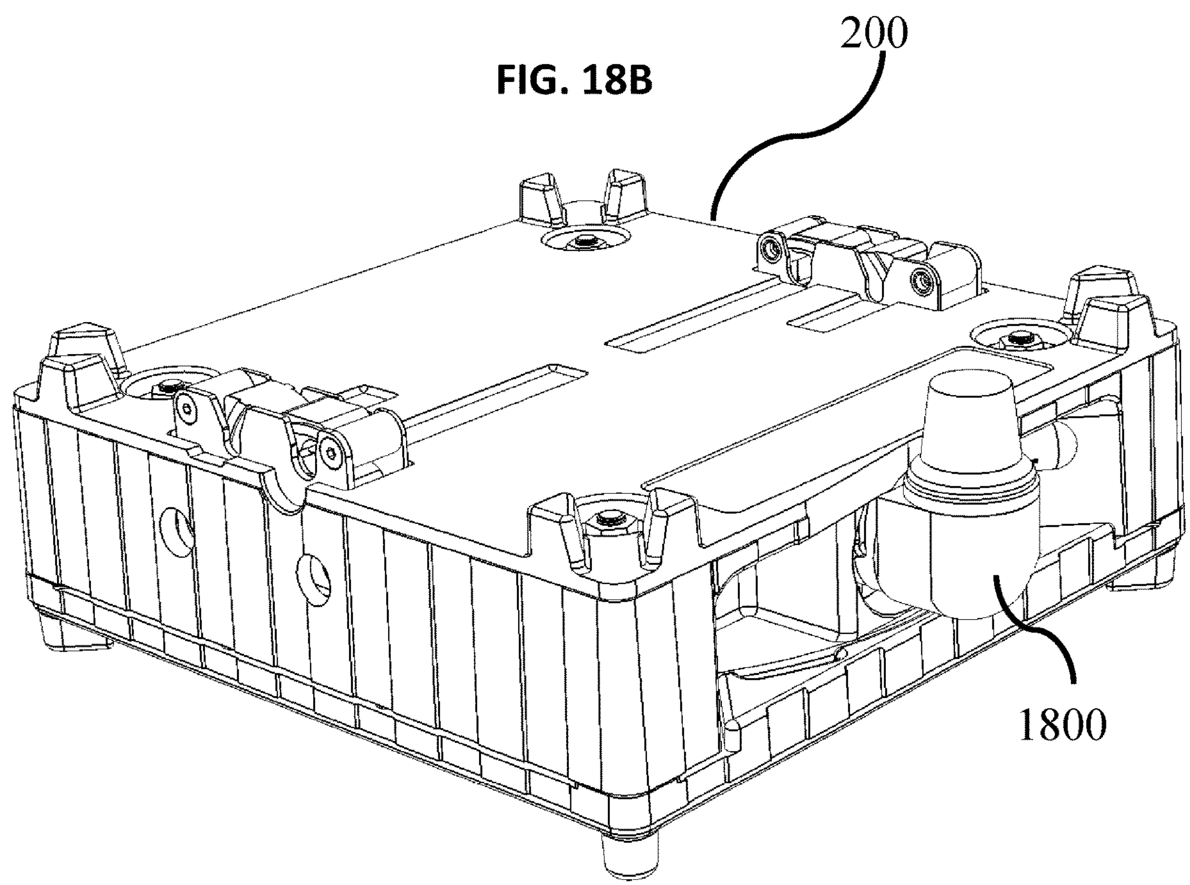
FIG. 18B illustrates the external device of FIG. 18A coupled to a seismic node.

As another example, FIG. 18A illustrates an embodiment of external device 1800 that may comprise or be coupled to acoustic transducer 1802, which may be smaller than transducer 1700. Transducer external device 1800 may be configured with locking ring 1820 and connector insert 1810 that is configured to electrically/optically mate with bulkhead connector assembly 400 located on seismic node 200, such as shown in FIG. 18B. As shown in FIG. 18B, transducer 1802 may be configured to extend above an upper surface of the seismic node. Transducer 1802 is a smaller device than larger transducer 1700, and may be representative of a communication modem or acoustic positioning device used at short ranges. Such a device may be useful when the node is deployed on a cable or wire. The nodes can use the acoustic modem to turn on and off the acoustics as well as turn off and on the node. Diagnostic data can also be sent over the modem to identify data quality and node health.

Figure 19B:
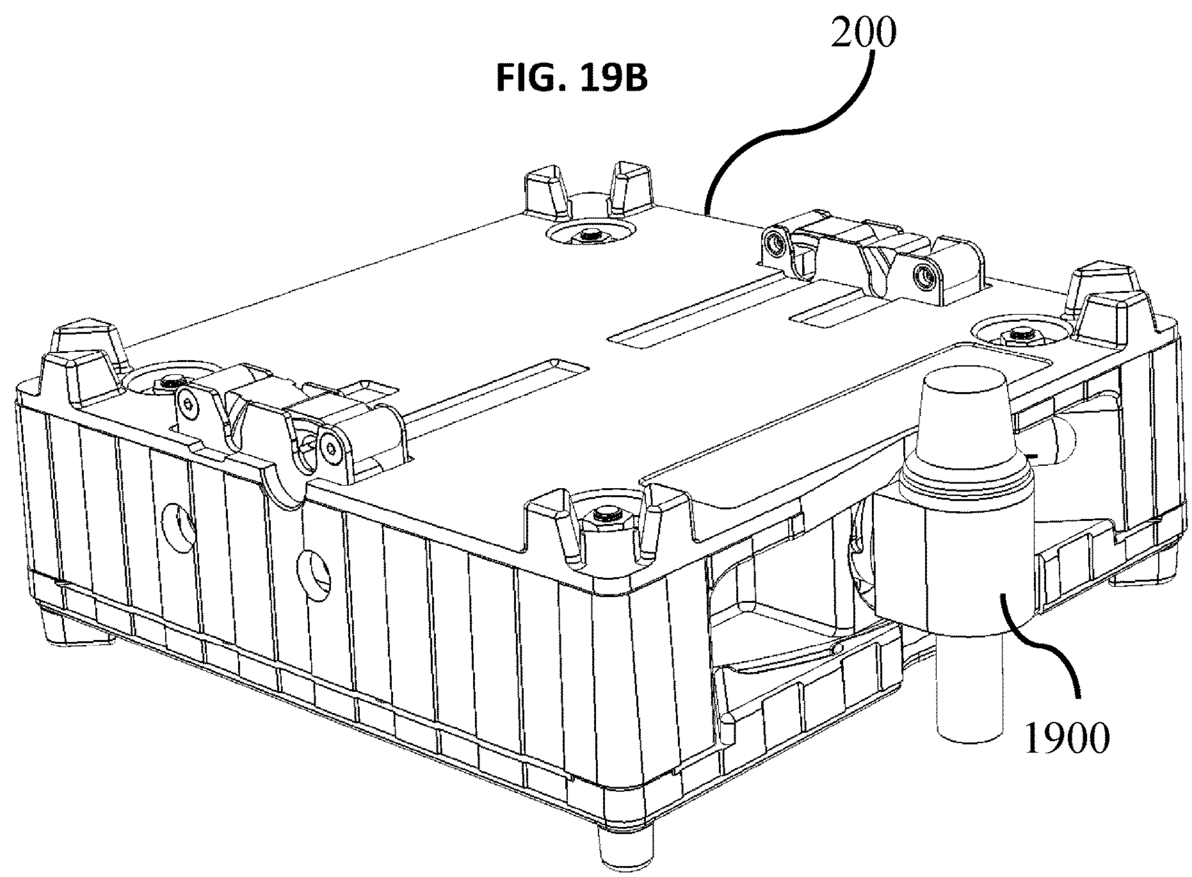
FIG. 19B illustrates the external device of FIG. 19A coupled to a seismic node

As yet another example, FIG. 19A illustrates an embodiment of external device 1900 that may comprise or be coupled to a plurality of electronic components, such as acoustic transducer 1902 and soil or chemical sensor 1904. This embodiment shows that an external device is not necessarily limited to one electronic device. In one embodiment, soil or chemical sensor 1904 is configured to couple with the seabed (such as the sediment on the seabed) as node 200 contacts and/or couples to the seabed. Other devices that need to be coupled to the seabed or seawater can alternatively be used, such as a salinity, conductivity, and/or temperature sensor, a velocity sensor, a chemical or hydrocarbon sensor, or anything else appropriate for external sensing with direct connection to the seawater and/or seabed. Of course, more than two electronic devices may be coupled to the external device 1900. External coupling device 1900 may be configured with locking ring 1920 and connector insert 1910 that is configured to electrically/optically mate with bulkhead connector assembly 400 located on seismic node 200, such as shown in FIG. 19B. In some embodiments, one or more of the electronic components 1902, 1904 is coupled to device 1900 in a wet mate connection as is known in the art, such that depending on the seismic survey, various external electronic components may be coupled to the seismic node for increased functionality. In other embodiments, a plurality of external devices 1900 may be configured with different electronic components, such that depending on the demands of the seismic survey, one of the external coupler devices 1900 may be selected with the appropriate electronic components.

Thus, in one embodiment, the external devices (whether located in the pressure cap assembly or external/coupled to the pressure cap assembly) are connected to the internal electrical components of the node through the bulkhead connector assembly using the pins and/or optic connectors and/or other data/power connectors built into the bulkhead assembly. Electrical or optical signals, communications and power can be passed to/from the internal components of the nodes using this interface which is protected from external ambient pressure. In general, those skilled in the art of underwater sensor design would be able to adapt their sensor to use the connector interface to the internal components of the node. In general, any external device that can be connected or used in a subsea acquisition system can be considered for mounting in the pressure cap or being connected to a remote component housing using signal, optical and power cabling to the internal components of the node.

All of the methods disclosed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

While the embodiments described herein are illustrates for an ocean bottom node, the electrical connections, plug assemblies, and circuits are not necessarily limited to such devices. For example, a flat circuit that is formed of a plurality of pins has many uses other than in a seabed environment, such as any environment in which it is hard to make an electrical connection, that is exposed to harsh or corrosive conditions, and/or when dirt or debris is an issue, such as in desert, subsea, or airplane applications. As another embodiment, the plug assembly and pressure cap assembly may be attached and detached from the bulkhead connector via manual, semi-automatic, or fully automatic methods, with or without the use of human operators. As another example, one external device may be used for subsea operations (such as an acoustic modem or transponder or one or more battery packs for increased subsea operational longevity) and another external device may be used for operations on the back deck of a marine vessel (such as a Wi-Fi device). As still another example, more than one bulkhead connector may be incorporated into each subsea device and/or seismic node for increased connections to external devices and enhanced functionality of the subsea device. Further, many other variations in the overall configuration of the node, flat circuit, pins, bulkhead connector assembly, pressure cap assembly, and plug connection assembly is possible within the scope of the invention. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

What is claimed is:

1. An ocean bottom seismic node, comprising:

a body;

a plurality of electronic components located within a pressure housing of the body, wherein the plurality of electronic components comprises at least one seismic sensor, at least one data recording unit, and at least one clock; and a flat electrical contact surface located in a cavity formed in an exterior portion of the body, wherein the flat electrical contact surface is coupled to at least one of the plurality of electronic components, wherein the flat electrical contact surface comprises one or more watertight seals configured to withstand water pressure on the ocean bottom.

2. The node of claim 1, further comprising a bulkhead connector mounted in an exterior portion of the body, wherein the flat electrical contact surface is located within the bulkhead connector.

3. The node of claim 1, wherein a surface of the cavity comprises no seals.

4. The node of claim 1, wherein the flat contact surface is located on a connector insert received within cavity, wherein the connector insert comprises one or more seals.

5. The node of claim 1, wherein the flat contact surface comprises one or more optical windows.

6. The node of claim 1, wherein the flat electrical contact surface comprises a plurality of pins, wherein each of the plurality of pins comprises a body portion and a head portion.

7. The node of claim 6, wherein each of the plurality of pins comprises one or more seals.

8. The node of claim 6, wherein each of the plurality of pins is substantially flush with the flat contact surface.

9. The node of claim 1, wherein the flat contact surface is configured to transfer power and data to the plurality of electronic components.

10. The node of claim 1, wherein the seismic node comprises an autonomous underwater vehicle (AUV).

11. A seismic node data transfer system, comprising:

a seismic node with a body;

a plurality of electronic components located within a pressure housing of the body, wherein the plurality of electronic components comprises at least one seismic sensor, at least one data recording unit, and at least one clock;

an electrical circuit formed by a first flat contact surface and a second flat contact surface, wherein the electrical circuit is configured to transfer data to at least one of the plurality of electronic components, wherein the first flat contact surface is located in a cavity formed in an exterior portion of the body, wherein the second flat contact surface is located on a removable connector insert, wherein the first flat electrical contact surface comprises one or more watertight seals configured to withstand water pressure on the ocean bottom.

12. The system of claim 11, wherein the second flat contact surface is mate with the first flat contact surface within the cavity.

13. The system of claim 11, wherein the first flat contact surface comprises a first plurality of pins and the second flat contact surface comprises a second plurality of pins, wherein the second plurality of pins is configured to couple with the first plurality of pins.

14. The system of claim 11, further comprising an electronic payload device electrically coupled to the second flat contact surface.

15. The system of claim 14, wherein the electronic payload device is located within a pressure cap that is at least partially located within the cavity.

16. A method of transferring data with a seismic node, comprising providing an ocean bottom seismic node with a body, wherein the seismic node comprises a first flat contact surface located in a cavity formed in an exterior portion of the body;

coupling a second flat contact surface of a removable connector to the first flat contact surface;

forming a flat electrical circuit between the first flat contact surface and the second flat contact surface; and transferring data between the removable connector and the seismic node through the flat circuit, wherein the flat electrical contact surface comprises one or more watertight seals configured to withstand water pressure on the ocean bottom.

17. The method of claim 16, wherein the data transfer is performed on the ocean bottom.

18. The method of claim 16, further comprising inserting the removable connector into the cavity and twisting the removable connector within the cavity to secure the removable connector to the seismic node.

* * * * *